United States Patent
John et al.

(10) Patent No.: US 7,936,863 B2
(45) Date of Patent: May 3, 2011

(54) METHOD AND APPARATUS FOR PROVIDING COMMUNICATION TASKS IN A WORKFLOW

(75) Inventors: Ajita John, Holmdel, NJ (US);
Reinhard P. Klemm, Basking Ridge, NJ (US); Doree D. Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 1687 days.

(21) Appl. No.: 10/955,918

(22) Filed: Sep. 30, 2004

(65) Prior Publication Data

US 2006/0067252 A1    Mar. 30, 2006

(51) Int. Cl.
*H04M 3/42* (2006.01)

(52) U.S. Cl. .......... 379/201.01; 370/259; 370/260; 370/352; 379/201.02; 379/265.09; 379/265.12; 705/7; 705/8; 705/9; 709/202; 709/206

(58) Field of Classification Search .......... 370/395.52, 370/259–260, 351–357; 709/228, 219, 202–203, 709/205–207; 379/201.01–201.02, 202.01, 379/265.01–266.1; 705/7–9
See application file for complete search history.

(56) References Cited

U.S. PATENT DOCUMENTS

| | | | |
|---|---|---|---|
| 5,619,555 A * | 4/1997 | Fenton et al. ............ | 379/88.11 |
| 5,754,830 A | 5/1998 | Butts et al. | |
| 5,862,223 A | 1/1999 | Walker et al. | |
| 5,887,136 A | 3/1999 | Yasuda et al. | |
| 5,899,995 A | 5/1999 | Millier et al. | |
| 5,930,238 A | 7/1999 | Nguyen | |
| 6,029,195 A | 2/2000 | Herz | |
| 6,044,378 A | 3/2000 | Gladney | |
| 6,078,928 A | 6/2000 | Schnase et al. | |
| 6,088,732 A | 7/2000 | Smith et al. | |
| 6,147,993 A | 11/2000 | Kloth et al. | |

(Continued)

FOREIGN PATENT DOCUMENTS

EP    0669733 A2    8/1995

(Continued)

OTHER PUBLICATIONS

Chakraborty et al., "Extending the Reach of Business Processes," Communications, 104-106 (Apr. 2004).

(Continued)

*Primary Examiner* — Hemant Patel
(74) *Attorney, Agent, or Firm* — Joseph B. Ryan; Jason Paul DeMont; Wayne S. Breyer

(57) ABSTRACT

Methods and apparatus are provided for developing and processing workflows that include communication tasks. A workflow is generated according to the present invention by inserting at least one communication node in the workflow. The communication node associated is with a communication task having at least one property that is resolved at run time. For example, the media type, recipient list, or timing of a communication may be resolved at run-time. A workflow generation tool is provided that generates a workflow based on (i) a user selection of at least one communication node to insert in a workflow, and (ii) a user specification of one or more properties of the communication task, wherein at least one property of the communication task is resolved at run time. At run-time, a workflow engine parses at least communication node in a workflow associated with a communication task and having at least one property that is resolved at run time.

20 Claims, 13 Drawing Sheets

U.S. PATENT DOCUMENTS

| | | | |
|---|---|---|---|
| 6,182,133 B1 | 1/2001 | Horvitz | |
| 6,195,657 B1 | 2/2001 | Rucker et al. | |
| 6,321,221 B1 | 11/2001 | Bieganski | |
| 6,321,268 B1 | 11/2001 | Dillon et al. | |
| 6,324,541 B1 | 11/2001 | de L'Etraz et al. | |
| 6,449,649 B1 | 9/2002 | Janay et al. | |
| 6,480,830 B1 * | 11/2002 | Ford et al. | 705/9 |
| 6,490,577 B1 | 12/2002 | Anwar | |
| 6,553,028 B1 | 4/2003 | Tang et al. | |
| 6,556,563 B1 | 4/2003 | Yarlagadda | |
| 6,584,472 B2 | 6/2003 | Classen | |
| 6,604,129 B2 * | 8/2003 | Slutsman et al. | 709/204 |
| 6,633,889 B2 | 10/2003 | Dessloch et al. | |
| 6,707,471 B2 * | 3/2004 | Funaki | 715/751 |
| 6,792,265 B1 | 9/2004 | Chan et al. | |
| 6,810,395 B1 | 10/2004 | Bharat | |
| 6,816,850 B2 | 11/2004 | Culliss | |
| 6,826,593 B1 | 11/2004 | Acharya et al. | |
| 6,847,959 B1 | 1/2005 | Arrouye et al. | |
| 6,901,394 B2 | 5/2005 | Chauhan et al. | |
| 6,915,298 B1 | 7/2005 | Cain et al. | |
| 6,934,750 B2 | 8/2005 | Hijikata et al. | |
| 6,993,590 B1 | 1/2006 | Gauthier et al. | |
| 7,046,779 B2 * | 5/2006 | Hesse | 379/202.01 |
| 7,050,963 B2 | 5/2006 | Flavin | |
| 7,069,308 B2 | 6/2006 | Abrams | |
| 7,076,244 B2 | 7/2006 | Lazaridis et al. | |
| 7,080,082 B2 | 7/2006 | Elder et al. | |
| 7,103,609 B2 | 9/2006 | Elder et al. | |
| 7,127,492 B1 | 10/2006 | Calo et al. | |
| 7,149,288 B2 | 12/2006 | Digate et al. | |
| 7,167,833 B2 * | 1/2007 | Mashiko et al. | 705/9 |
| 7,240,270 B2 | 7/2007 | Bellier et al. | |
| 7,263,177 B1 | 8/2007 | Paterik et al. | |
| 7,284,002 B2 | 10/2007 | Doss et al. | |
| 7,289,975 B2 | 10/2007 | Clarke et al. | |
| 7,305,437 B2 | 12/2007 | Horvitz et al. | |
| 7,325,202 B2 | 1/2008 | Shirriff | |
| 7,418,090 B2 * | 8/2008 | Reding et al. | 379/202.01 |
| 7,587,664 B2 | 9/2009 | Newbold | |
| 2002/0038331 A1 | 3/2002 | Flavin | |
| 2002/0065110 A1 | 5/2002 | Enns et al. | |
| 2002/0087520 A1 | 7/2002 | Meyers | |
| 2002/0143994 A1 * | 10/2002 | Sun et al. | 709/246 |
| 2002/0156787 A1 * | 10/2002 | Jameson et al. | 707/10 |
| 2002/0156841 A1 | 10/2002 | Landfeldt et al. | |
| 2002/0174237 A1 | 11/2002 | Shrinivasan et al. | |
| 2002/0188620 A1 | 12/2002 | Doss et al. | |
| 2003/0014399 A1 | 1/2003 | Hansen et al. | |
| 2003/0014488 A1 | 1/2003 | Dalal et al. | |
| 2003/0028525 A1 | 2/2003 | Santos et al. | |
| 2003/0140037 A1 | 7/2003 | Deh-Lee | |
| 2003/0158915 A1 | 8/2003 | Gebhart | |
| 2003/0163520 A1 | 8/2003 | Bussani et al. | |
| 2003/0227920 A1 | 12/2003 | Benayoun et al. | |
| 2004/0034723 A1 * | 2/2004 | Giroti | 710/8 |
| 2004/0041902 A1 * | 3/2004 | Washington | 348/14.01 |
| 2004/0088275 A1 | 5/2004 | Elder et al. | |
| 2004/0088303 A1 | 5/2004 | Elder et al. | |
| 2004/0122803 A1 | 6/2004 | Dom et al. | |
| 2004/0133638 A1 | 7/2004 | Doss et al. | |
| 2004/0161090 A1 | 8/2004 | Digate et al. | |
| 2004/0186852 A1 | 9/2004 | Rosen | |
| 2004/0199580 A1 * | 10/2004 | Zhakov et al. | 709/204 |
| 2004/0205766 A1 | 10/2004 | Lee et al. | |
| 2004/0260677 A1 | 12/2004 | Malpani et al. | |
| 2005/0018827 A1 * | 1/2005 | Himmel et al. | 379/202.01 |
| 2005/0033657 A1 | 2/2005 | Herrington et al. | |
| 2005/0034079 A1 * | 2/2005 | Gunasekar et al. | 715/753 |
| 2005/0065797 A1 | 3/2005 | Haenel | |
| 2005/0071421 A1 | 3/2005 | Calo et al. | |
| 2005/0076013 A1 | 4/2005 | Hilbert et al. | |
| 2005/0125487 A1 | 6/2005 | O'Connor et al. | |
| 2005/0131897 A1 | 6/2005 | Grasso et al. | |
| 2005/0222987 A1 | 10/2005 | Vadon | |
| 2005/0232166 A1 | 10/2005 | Nierhaus | |
| 2005/0270973 A1 | 12/2005 | Raev et al. | |
| 2005/0278326 A1 | 12/2005 | Horvitz et al. | |
| 2005/0289470 A1 | 12/2005 | Pabla et al. | |
| 2006/0044307 A1 | 3/2006 | Song | |
| 2006/0136377 A1 | 6/2006 | Patt-Shamir et al. | |
| 2006/0177034 A1 * | 8/2006 | Reding et al. | 379/211.02 |
| 2007/0094024 A1 * | 4/2007 | Kristensson et al. | 704/252 |
| 2007/0165591 A1 | 7/2007 | Higure et al. | |
| 2008/0239995 A1 * | 10/2008 | Lee et al. | 370/260 |

FOREIGN PATENT DOCUMENTS

| | | | |
|---|---|---|---|
| WO | 0135272 | A2 | 5/2001 |
| WO | 2004044705 | A2 | 5/2004 |
| WO | 2004046875 | A2 | 6/2004 |

OTHER PUBLICATIONS

Gay, Sonia L., "U.S. Appl. No. 101979,759 Office Action Dec. 31, 2009", , Publisher: USPTO, Published in: US.

Ng, Christine Y "U.S. Appl. No. 10/989,104 Office Action Nov. 28, 2008", , Publisher: USPTO, Published in: US.

Ng, Christine Y "U.S. Appl. No. 10/989,104 Office Action May 8, 2008", , Publisher: USPTO, Published in: US.

Smith, Joshua Y., "U.S. Appl. No. 10/989,105 Office Action Dec. 10, 2009", , Publisher: USPTO, Published in: US.

Smith, Joshua Y., "U.S. Appl. No. 10/989,105 Office Action Dec. 23, 2006", , Publisher: USPTO, Published in: US.

Smith, Joshua Y., "U.S. Appl. No. 10/989,105 Office Action Jan. 9, 2008", , Publisher: USPTO, Published in: US.

Smith, Joshua Y., "U.S. Appl. No. 10/989,105 Office Action Jun. 24, 2009", , Publisher: USPTO, Published in: US.

Smith, Joshua Y., "U.S. Appl. No. 10/989,105 Office Action Jul. 9, 2008", , Publisher: USPTO, Published in: US.

Schorgg, A., "EP Application No. 05254998.7-2414 Office Action Nov. 29, 2006", , Publisher: EPO, Published in: EP.

Schorgg, A., "EP Application No. 05254998.7-2414 Office Action May 13, 2008", , Publisher: EPO, Published in: EP.

Schorgg, A., "EP Application No. 05254998.7-2414 European Search Report Feb. 7, 2006", , Publisher: EPO, Published in: EP.

Gay, Sonia L., "U.S. Appl. No. 10/979,759 Office Action Mar. 3, 2009", , Publisher: USPTO, Published in: US.

Gay, Sonia L., "U.S. Appl. No. 10/979,759 Office Action Jul. 24, 2009", , Publisher: USPTO, Published in: US.

Le, Hund D., "U.S. Appl. No. 10/955,917 Office Action Mar. 12, 2007", , Publisher: USPTO, Published in: US.

Kautz et al., "Agent Amplified Communication", "Proceedings of the Thirteenth National Conference on Artifical Intelligence (AAAI-96)", 1996, Published in: US.

De Laat, Maarten, "Network and content analysis in an online community discourse", 2002, Publisher: University of Nijmegen, Published in: NL.

Kautz et al., "ReferralWeb: Combining Social Networks and Collaborative Filtering", "Communications of the ACM", Mar. 1997, vol. 40, No. 3, Published in: US.

Smith, Joshua Y., "U.S. Appl. No. 10/989,105 Panel Decision May 25, 2010", , Publisher: USPTO, Published in: US.

Gay, Sonia L., "U.S. Appl. No. 10/979,759 Office Action Jul. 6, 2010", , Publisher: USPTO, Published in: US.

Nazzaro, A, "EP Application No. 05254895 Office Action Oct. 30, 2006", , Publisher: EPO, Published in: EP.

"EP Application No. 05254895.5 Office Action Mar. 20, 2009", , Publisher: EPO, Published in: EP.

"EP Application No. 05 254 895.5 Office Action May 19, 2008", , Publisher: EPO, Published in: EP.

"Application No. 05254895.5 Decision to Refuse Apr. 15, 2009", , Publisher: EPO, Published in: EP.

Nazzaro, A, "EP Appliction No. 05254895 Search Report Apr. 3, 2006", , Publisher: EPO, Published in: EP.

Le, Hund D., "U.S. Appl. No. 10/955,917 Advisory Action Nov. 14, 2008", , Publisher: USPTO, Published in: US.

Le, Hung D. , "U.S. Appl. No. 10/955,917 Office Action Jan. 15, 2008", , Publisher: USPTO, Published in: US.

Le, Hung D., "U.S. Appl. No. 10/955,917 Office Action Feb. 17, 2009", , Publisher: USPTO, Published in: US.

Le, Hung D., "U.S. Appl. No. 10/955,917 Office Action Jul. 27, 2010", , Publisher: USPTO, Published in: US.

Le, Hung D., "U.S. Appl. No. 10/955,917 Office Action Aug. 1, 2008", , Publisher: USPTO, Published in: US.

Le, Hung D., "U.S. Appl. No. 10/955,917 Office Action Aug. 16, 2007", , Publisher: USPTO, Published in: US.

"EP Application No. 05254895.5 Summons to Oral Proceedings Jan. 26, 2009", , Publisher: EPO, Published in EP.

Gay, Sonia L., "U.S. Appl. No. 10/979,759 Office Action Nov. 12, 2010", , Publisher: USPTO, Published in: US.

Schwartz et al., "Discovering Shared Interests Among People Using Graph Analysis of Global Electronic Mail Traffic", Oct. 1992, Publisher: Department of Computer Science, University of Colorado, Published in: US.

Smith, Joshua Y., "U.S. Appl. No. 10/989,105 Office Action Nov. 26, 2010", , Publisher: USPTO, Published in: US.

Le, Hung D., "U.S. Appl. No. 10/955,917 Office Action Nov. 26, 2010", , Publisher: USPTO, Published in: US.

\* cited by examiner

Properties

Display and setup properties:

| | | |
|---|---|---|
| Connector Type | Email | 810 |
| Priority | High | 820 |
| Alert Message | JoinConference | 830 |
| Response Timeout | 1 hour | 840 |
| Use Presence Information? | Yes | 850 |
| Select Recipient | Customer | 865 |

[Add Recipient] 880    [Remove Recipient] 885

Recipient List — 890
- AccountsPayable_id
- Appraiser_id
- Customer_id

Originator: mercury@research.avayalabs.com — 895

[Save Data]

[OK]  [Cancel]

METHOD AND APPARATUS FOR PROVIDING COMMUNICATION TASKS IN A WORKFLOW

CROSS-REFERENCE TO RELATED APPLICATIONS

The present application is related to United States Patent Application, entitled "Method and Apparatus For Data Mining Within Communication Session Information Using an Entity Relationship Model," (application Ser. No. 10/955,917), filed contemporaneously herewith and incorporated by reference herein.

FIELD OF THE INVENTION

The present invention relates generally to methods and apparatus for communicating with one or more users, and more particularly, to methods and apparatus for automatically inserting communication tasks, such as contacting one or more users, into a workflow.

BACKGROUND OF THE INVENTION

Many enterprise applications must interact with human users through a variety of media. For example, applications, such as e-commerce, customer relationship management, supply chain and crisis management applications, often interact with a user using one or more of voice, electronic mail, conferencing, instant messaging or text messaging communications media.

Traditionally, developers of such enterprise applications had to integrate the applications with a variety of communication servers that implement the desired communication media. Generally, developers were required to have a thorough understanding of the complex details of the required protocols and devote a substantial part of the application development effort to the integration with communication servers. In addition, developers were required to address the convergence of communication capabilities across protocols and media, i.e., the extension of capabilities from one communication protocol and medium to others and the alignment of similar, yet incongruous capabilities across different protocols and media.

Workflows provide a technique for automating business processes. A workflow is normally comprised of a series of logical steps or tasks that define a business process. Each step in the workflow typically contains a task to be completed and identifies the participants that should perform the task. In a workflow, documents, information or tasks are often communicated to one or more participants according to a predefined procedure. For example, a task in a workflow may specify that a document should be sent to one or more participants for review. Automated workflows help to ensure increased efficiency and accuracy when distributing information or tasks, and that tasks are performed according to the appropriate policies and procedures. Existing workflow engines, however, do not automate the process of including communication tasks in a workflow.

A need therefore exists for methods and apparatus for developing communications applications that bridge the communication media and communication application worlds. A further need exists for a communication application design and execution platform that provides a high-level workflow-based programming interface that facilitates the creation and maintenance of complex communications applications. Yet another need exists for a communication application design and execution platform that allows communication tasks to be included in a workflow.

SUMMARY OF THE INVENTION

Generally, methods and apparatus are provided for developing and processing workflows that include communication tasks. A workflow is generated according to the present invention by inserting at least one communication node in the workflow. The communication node associated is with a communication task having at least one property that is resolved at run time. For example, the media type, recipient list, or timing of a communication may be resolved at run-time.

According to another aspect of the invention, a workflow generation tool is provided that generates a workflow based on (i) a user selection of at least one communication node to insert in a workflow, and (ii) a user specification of one or more properties of the communication task, wherein at least one property of the communication task is resolved at run time. The workflow generation tool optionally provides a mechanism for automatically configuring one or more properties of the communication task.

At run-time, a workflow engine parses a workflow comprising at least one business node and at least one communication node, the communication node is associated with a communication task and has at least one property that is resolved at run time.

A more complete understanding of the present invention, as well as further features and advantages of the present invention, will be obtained by reference to the following detailed description and drawings.

BRIEF DESCRIPTION OF THE DRAWINGS

FIG. 8 illustrates an exemplary properties dialog box for configuring the alert node of FIG. 7;

DETAILED DESCRIPTION

Figure 1:
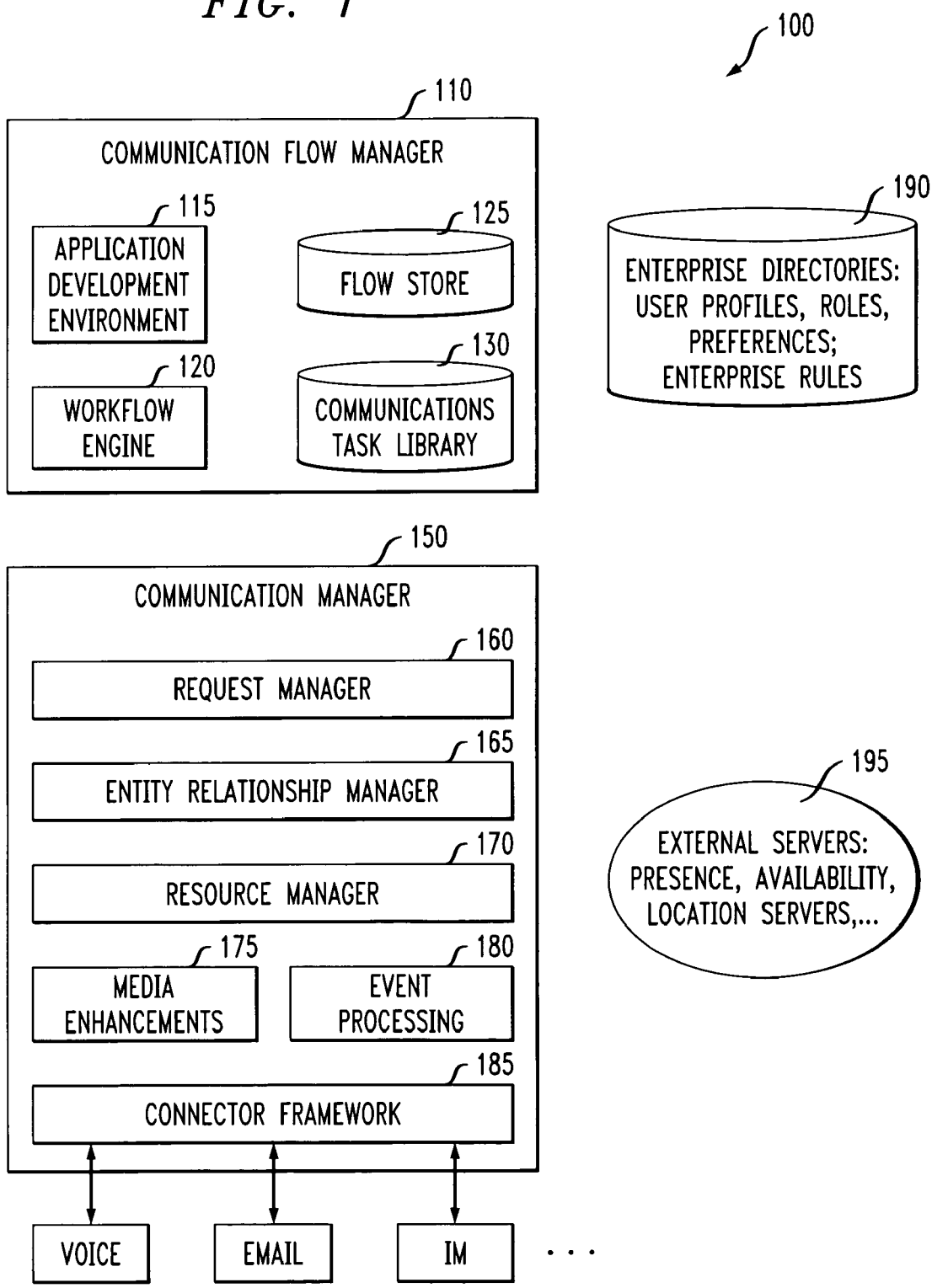
FIG. 1 is a schematic block diagram of a communication application development and execution platform incorporating features of the present invention.

FIG. 1 is a schematic block diagram of a communication application development and execution platform 100 incorporating features of the present invention. The communication application design and execution platform 100 provides a high-level workflow-based programming interface that facilitates the creation and maintenance of complex communications applications. The communication application design and execution platform 100 allows an application developer to integrate an application with existing user communication services, including resource and session management, cross-connection of disparate user communication services, enhancements to the native capabilities of communication services, support for reasoning about past and present communication operations, and converged presence. As discussed hereinafter, the runtime environment of the exemplary communication application design and execution platform 100 comprises a workflow execution layer containing a set of communication-centric extensions to an existing workflow engine and a communication management layer leveraging the Java 2 Enterprise Edition (J2EE) platform.

The communication application design and execution platform 100 models communication applications as workflows, also referred to as flows, over application entities modeling users and communication sessions. The flows represent communication applications as compositions of task nodes, where task nodes represent units of communication activity. The model enables powerful applications, utilizing properties such as presence over groups of users and various media, to be developed easily. The present invention may be implemented using a conventional workflow engine, such as the IBM Process Choreographer™, as modified herein to provide the features and functions of the present invention. Generally, the conventional workflow engine is extended herein to support the addition of communication tasks to a workflow. In particular, the conventional workflow engine is extended to process communication nodes in a workflow.

According to one aspect of the present invention, an application developer can automatically insert communication tasks into a workflow being developed. While conventional workflow systems require a manual determination of who, when and how to contact, gather responses from, and to bring into a collaboration, the present invention allows this task to be automated enabling complex human decisions to be automatically provided to business processes. The application developer can design a workflow that sequences the business and communication tasks. As discussed hereinafter, an exemplary embodiment of the present invention provides a graphical user interface that allows a developer to select an icon for various tasks, such as "contact a person" "establish a conference," and inserting the icon into an appropriate portion of a workflow being developed. The details of how to contact the person, such as protocol and server connections, are addressed by the communication application design and execution platform 100.

Communication Applications

Figure 2:
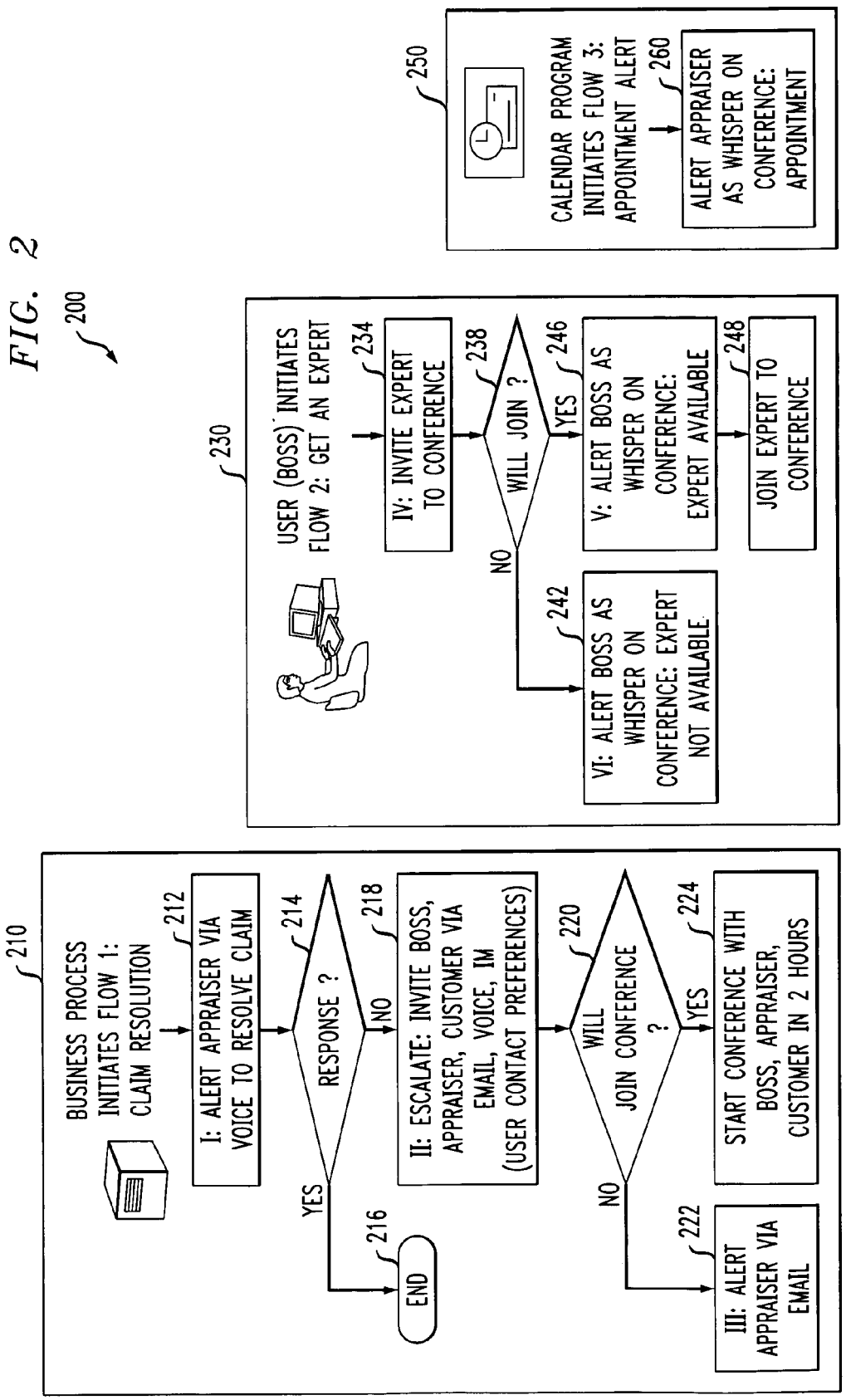
FIG. 2 illustrates an exemplary application that demonstrates the need for the present invention.

Communication applications involve interactions between communication servers, devices and people. Recently, the need for carefully orchestrated complex communication applications has increased, especially in enterprises where the need to contact and connect the right group of people at the right time, via the right communication medium, and with the right content is critical. FIG. 2 illustrates an exemplary application 200 that reflects the intricacies and complexities of today's communication needs. While the exemplary application 200 revolves around the timely resolution of an auto insurance claim by people such as a claim appraiser and an auto collision expert, other contexts, such as a hospital scenario where a resident doctor, a nurse and a specialist collaborate for consultation on a patient's health or a business context where the right set of executives need to alerted and brought into a conference when the company's stock price changes by a large amount in a short period of time could also be chosen.

The application 200 brings a group of users together to solve an issue. The issue is critical, specialized, and time-sensitive; it is imperative that the right users using different types of media and modalities (e.g. voice, IM, email) be contacted based on a combination of presence and availability information, user rules and enterprise policies, and all the other information stored in the entity relationship model. In addition, the application 200 collects responses from the users, makes decisions based on the responses and brings users into a shared environment using conferencing. The notion of presence includes all means of presence known to the application 200. These may come from disparate sources and may include presence on IM, presence on a web portal, presence on a conference, i.e., any channel that is tracked or information about which can be queried by the application.

As shown in FIG. 2, the application 200 comprises three independent processes or flows 210, 230, 250. The deadline for resolving an insurance claim is a short interval (say, 24 hours) away. A business process can detect this condition and trigger a first flow 210 to resolve the claim. In the claim resolution flow 210, a claim appraiser is first contacted during step 212 via voice in the exemplary implementation to render a menu driven voice message so that the appraiser can resolve the message immediately. The message gives brief information about the claim and states that more detailed information can be found if the appraiser logs into his user portal. If a response is received from the appraiser resolving the claim during step 214, no further action is required and the flow terminates during step 216.

If no response is received from the appraiser during step 214, the claim resolution flow 210 proceeds to escalate the problem during step 218 by sending invitations for a voice conference, to be started in say, 2 hours, to the appraiser's boss, the customer, and the appraiser. The application 200 sends the invitations using a combination of presence and availability information, user rules and enterprise policies as well as classification of the message (e.g. its importance). User rules include preferences that each user has set up in a personalized contact list that specifies how that user would like to be contacted at different times during the day. This may mean that, for instance, the boss receives the invitation via email, the appraiser via voice, and the customer via IM. The invitation can be a derived from a template that includes, for example, information about the claim and the expected duration of the conference call. The recipients of the invitation can respond by either accepting or rejecting the invitation.

Once all responses have been received by the system or a time limit has elapsed for receiving all responses, the claim resolution flow 210 checks if a minimum number of people (say, 2) have accepted the invitation during step 220. If not, the claim resolution flow 210 sends a claim resolution reminder to the appraiser during step 222 via a high priority email message. If a minimum number of people have responded in the affirmative, the claim resolution flow 210 establishes a voice conference with the three invitees at the scheduled time of the conference during step 224. This conference is named claim Conference. The claim resolution flow 210 is completed at this point.

During the claim Conference, the boss realizes that an auto collision expert is needed to answer some of the questions that the customer is posing. However, there are many auto collision experts in the company and the boss does not know who may be available to join the conference. The boss then initiates an expert identification flow 230, which sends out invitations during step 234 to all users that the entity relationship model identifies as auto collision experts and as available to immediately join the ongoing claim Conference. If it is determined during step 238 that no expert responds to the invitation within a configured time limit, the boss needs to be alerted that no expert is available during step 242. The system uses presence information it has already collected that the boss is present on an ongoing conference and opts to send a "whisper" on the same audio channel that she is using for the claim Conference. A whisper is a message rendered as speech and is audible only to the recipient, not the other conferees. If an expert responds to the invitation, the boss is alerted, during step 246, again as a whisper, that an expert is available and the expert automatically bridged into the conference. Alternatively, an IM message could be sent to alert the boss.

A third flow, referred to as an appointment alert flow 250, is initiated by the appraiser's calendar program. A previously scheduled appointment on the appraiser's calendar is about to begin and the reminder for that appointment is sent during step 260 as a whisper on the channel that the appraiser is using for the claim Conference. As the exemplary auto insurance application 200 illustrates, communication applications have moved beyond a simple voice call or email and it is tedious and complicated to build such applications.

As previously indicated, the communication application development and execution platform 100 models communication applications using a workflow model where communication activities and decision nodes are composed in a directed graph to form a communication flow. Communication activities model high-level abstractions of communication services such as alerts, gathering responses, and conferencing. Decision nodes access the information in the entity relationship model to provide branching and looping within communication flows. In addition, specialized nodes to access external databases and suspend flows to wait for user input may also exist.

As shown in FIG. 1, the communication application development and execution platform and execution platform 100 comprises a communication flow management layer 110 and a communication management layer 150. The flow management layer 110 is responsible for the communication flows and consists of a workflow engine 120 with communication-centric extensions responsible for the execution of communication activities. The flows are compositions of services offered by the communication management layer 110. The communication management layer 150 performs the session, relationship, resource, request, and other types of management, as discussed further below in a section entitled "Communication Management Layer."

The underlying communication infrastructure encompasses a variety of communication servers, such as voice switches, email and IM servers. The platform relies on enterprise directories that store user information and enterprise policies. The platform can access additional external presence, availability, and location servers, if needed.

Communication Flow Management Layer

The communication flow management layer 110 is responsible for the creation, storage, and execution of the flows. As shown in FIG. 1, the communication flow management layer 110 comprises an application development environment (ADE) 115 that allows flows to be designed, a flow store 125 that stores the designed flows as flow specifications, a work-flow engine 120 that interprets the flow specifications to execute them and a communications task library 130 that contains the modules corresponding to each type of node in the flows.

In the exemplary implementation, the application development environment 115 is based on the open source Eclipse platform and provides a palette of task nodes, each of which can be selected, dragged and dropped into a communication flow. Each selected node can be configured for communication-specific properties using the communications task library 130. The flow store 125 consists of XML representations of the flows. The workflow engine 120 executes the composition of disparate communication services as a flow. As used herein, the term flow is used instead of workflow in order to distinguish typical business processes, such as document management, from communication processes. A workflow is defined by the Workflow Management Coalition (WFMC) as "the automation of a business process, in whole or part, during which documents, information or tasks are passed from one participant to another for action, according to a set of procedural rules."

Generally, a workflow is the operational aspect of a work procedure: how are the tasks are structured, who performs them, what is their relative order, how are they synchronized, how does the information to support the tasks move and how are tasks tracked. The concept of workflows is adapted for communications by defining a communication flow to be the automation of a set of communication tasks between one or more participants according to a set of procedural rules.

The WFMC defines a workflow management system as a system that defines, creates and manages the execution of workflows through the use of software, running on one or more workflow engines, which is able to interpret the process definition, interact with workflow participants and, where required, invoke the use of IT tools and applications. Such a system consists of software components to store and interpret process definitions, create and manage workflow instances as they are executed, and control their interaction with workflow participants and applications. It also provides administrative and supervisory functions. In the communication middleware platform, the workflow management system is comprised of the workflow engine and a communication tasks library.

Communication Flows

Figure 3:
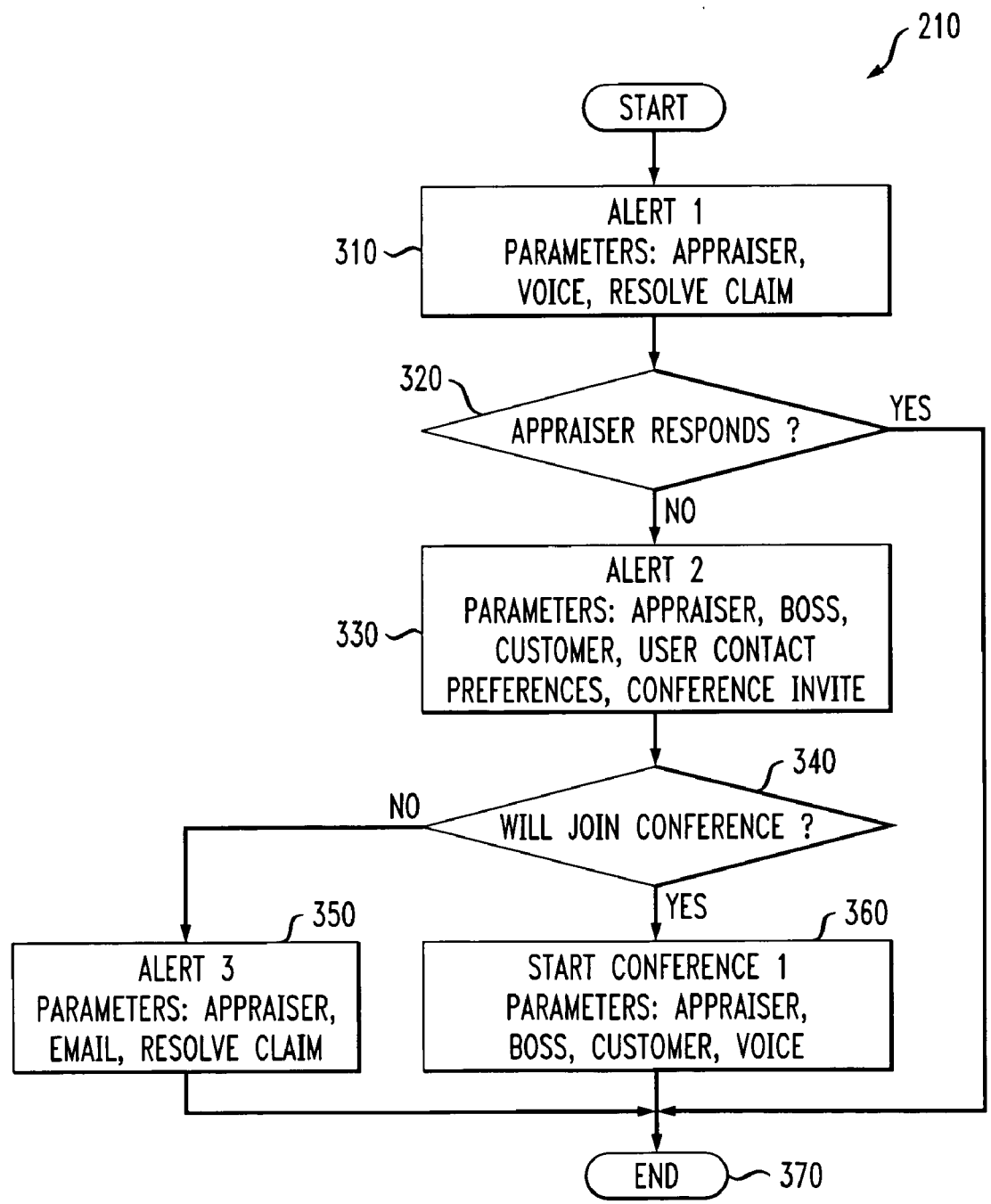
FIG. 3 is a flow chart describing the claim resolution flow of FIG. 2 in further detail.

Communication flows are compositions of task nodes in a directed graph. FIG. 3 is a flow chart representation of the claim resolution flow 210 of FIG. 2. A shown in FIG. 3, the claim resolution flow 210 initially sends an alert to a claim appraiser during step 310. The parameters of the communication may specify that the appraiser is contacted via voice to resolve a claim. The message may give brief information about the claim and state that more detailed information can be found if the appraiser logs into his user portal. If a response is received from the appraiser resolving the claim during step 320, no further action is required and the flow terminates during step 370.

If no response is received from the appraiser during step 320, the claim resolution flow 210 proceeds to escalate the problem during step 330 by sending a second alert. The parameters of the second communication may specify that the appraiser, his or her boss and the customer are contacted in accordance with their corresponding preferences to invite them to a conference call. The invitation can be a derived from a template that includes, for example, information about the claim and the expected duration of the conference call. The recipients of the invitation can respond by either accepting or rejecting the invitation.

Once all responses have been received by the system or a time limit has elapsed for receiving all responses, the claim resolution flow 210 checks if a minimum number of people have accepted the invitation during step 340. If not, the claim resolution flow 210 sends a claim resolution reminder to the appraiser during step 350 via a high priority email message. If a minimum number of people have responded in the affirmative, the claim resolution flow 210 establishes a voice conference with the three invitees at the scheduled time of the conference during step 360. The claim resolution flow 210 is then completed at step 370.

A flow specifies the sequencing and synchronizing of communication activities in a standalone communication interaction. A set of flows defines a complete communication application and operates over a set of shared application entities such as the claim conference in the claim resolution flow 210. This allows the expert identification flow 230 in FIG. 2 to access the communication session corresponding to the claim conference that was set up by the claim resolution flow 210 and add the expert to the same claim conference.

Workflow Engine

The workflow engine 120 (FIG. 1) may be implemented in Java. The workflow engine 120 can be embodied using a commercial workflow engine as modified herein to provide the features and functions of the present invention. Workflows are represented using a markup language that is usually a derivative of XML, such as the Business Process Execution Language (BPEL). The communication flows can be stored in XML. The workflow engine 120 is capable of interpreting flow specifications and executing them. In addition, the workflow engine 120 provides administrative functions to manage flows and interfaces to invoke them.

Communication Application Entities

Communication application entities are variables in a flow that store state. For each entity, there is a set of named attributes that store values for properties of the entity. Communication application entities and their attributes are associated with specific communication applications (sets of flows). For example, for the exemplary auto insurance application 200 in FIG. 2, some of the attributes for the appraiser may include unique handle; response to alert 1; presence on IM and presence on claim conference.

There are two types of communication application entities: users and communication sessions. Application entities have runtime representations in the entity relationship model and design time representations in the application development environment. An example of a communication session entity is a voice conference. Some of the attributes for a conference include session identifier that uniquely identifies the session; descriptive name of the conference; invitees to the conference; host of the conference; participants in the conference (may be different from invitees if everyone in the invitee list does not join the conference); start time of the conference; end time of the conference; and privileges for the participants.

The exemplary auto insurance application 200 requires four user entities: appraiser, boss, customer, and expert and one communication session entity: claim conference.

Application entities are coupled to the task nodes in a flow by being associated with the properties of the task node. For instance, the list of recipients of alert 2 in FIG. 2 (step 218) is appraiser, boss, and customer. A task node may change the state of an application entity by changing the value of an attribute in the application entity. For example, alert 2 in FIG. 2 may change the response attributes of the appraiser, boss, and customer if these users have responded to the alert. Task nodes may also access the values for the attributes in application entities. The decision node after the node for alert 2 checks the value of these attributes to decide whether or not to proceed to set up the voice conference. The application developer has to set up the application entities before designing the flows for an application. This allows the association of the entities with the task nodes in the application as the application is being designed.

Communications Task Library

The communications task library 130 contains modules for executing the different types of nodes in the communication application development and execution platform 100. This library 130 can be extended with new types of communication tasks without changing the workflow engine 120. The tasks may access different sources of information such as the entity relationship model. The tasks communicate with the communication manager 150 for service requests, such as sending an email or an IM message. Support for a new task can be incorporated by adding the modules corresponding to the new task to the library 130 and to the ADE 115. No change is required to the workflow engine 120.

For each task node, there is a set of properties/parameters that have to be configured during the design of the communication application. These properties and their values determine the behavior of the task node at execution time. To illustrate the nature of the communication nodes, the alert node and the voice conference node are discussed hereinafter. Similar designs exist for communication nodes, such as presence, IM conference and adding people to an existing conference.

The function of an alert node is to send a message to one or more users. While the underlying communication manager 150 and the communication switches may have separate components for media-specific alerts, such as an email message, an IM message or a voice message, the task node for the alert presents a unified view of an alert to provide a level of abstraction intended to facilitate the easy development of communication applications. The goal is to present unified views of communication capabilities that may be implemented in different ways on different servers. Some of the properties of the alert node include recipients (user application entities); message and its importance; any application context for message (other application entities, e.g. the customer's name and information in the claim resolution flow 210 in FIG. 2 may be sent as part of the message); time for delivery of message; whether presence can be used for delivery of message (optional); choice of media (email/IM/voice) for delivery of message (optional); and timeout for checking for responses to message.

If presence is to be used for the delivery of a message, the alert task node queries the entity relationship model in the underlying communication manager 150 for presence information relating to each of the recipients and accordingly selects the media for delivery of the message. If both presence and a specific media are not chosen for the delivery of the message, the alert node defaults to using the user contact preferences for each of the users.

The message of an alert node may be a dialog script if the alert is delivered using a voice connection or a web-based response template if the alert is delivered over IM or email. Responses to the alert are collected by the underlying communication manager 150 and can be accessed by the task nodes in the flow layer 110.

The function of the voice conference node is to set up a voice conference among a group of people. Some of the properties of this node include conference application entity; name of conference; invitees to conference; start time for conference; and message and application context to be heard at start of conference User Management Users are a critical part of any communication application and the goal of any communication application is to enable a rich user experience. User data is typically stored in a directory-based structure and accessed through a protocol such as LDAP. User directories allow the storage of communication attributes for a user such as a unique handle, telephone number, email and IM addresses. Role-based attributes that show the skill of a user are particularly important so that role-based searches can be done and people with the right skills can be quickly contacted to resolve critical issues, for example, using the data mining techniques discussed further below in conjunction with FIGS. 5-9. Additionally, user preferences that indicate, for each user, the best way to contact the user at a given time are extremely useful in ensuring a smooth communication experience. Typically, an enterprise stores this type of information in directories. The entity relationship model either incorporates this information by copying it or accesses the appropriate directories on demand without copying the information.

Communication Management Layer

In the exemplary embodiment, the communication management layer 150 encompasses several J2EE components and some peripheral Java 2.0 Standard Edition (J2SE) components. The communication management layer 150 can be implemented as an extension of J2EE and can maximize the number of services performed by J2EE on behalf of the communication application development and execution platform 100.

API to Flow Management Layer

Figure 4:
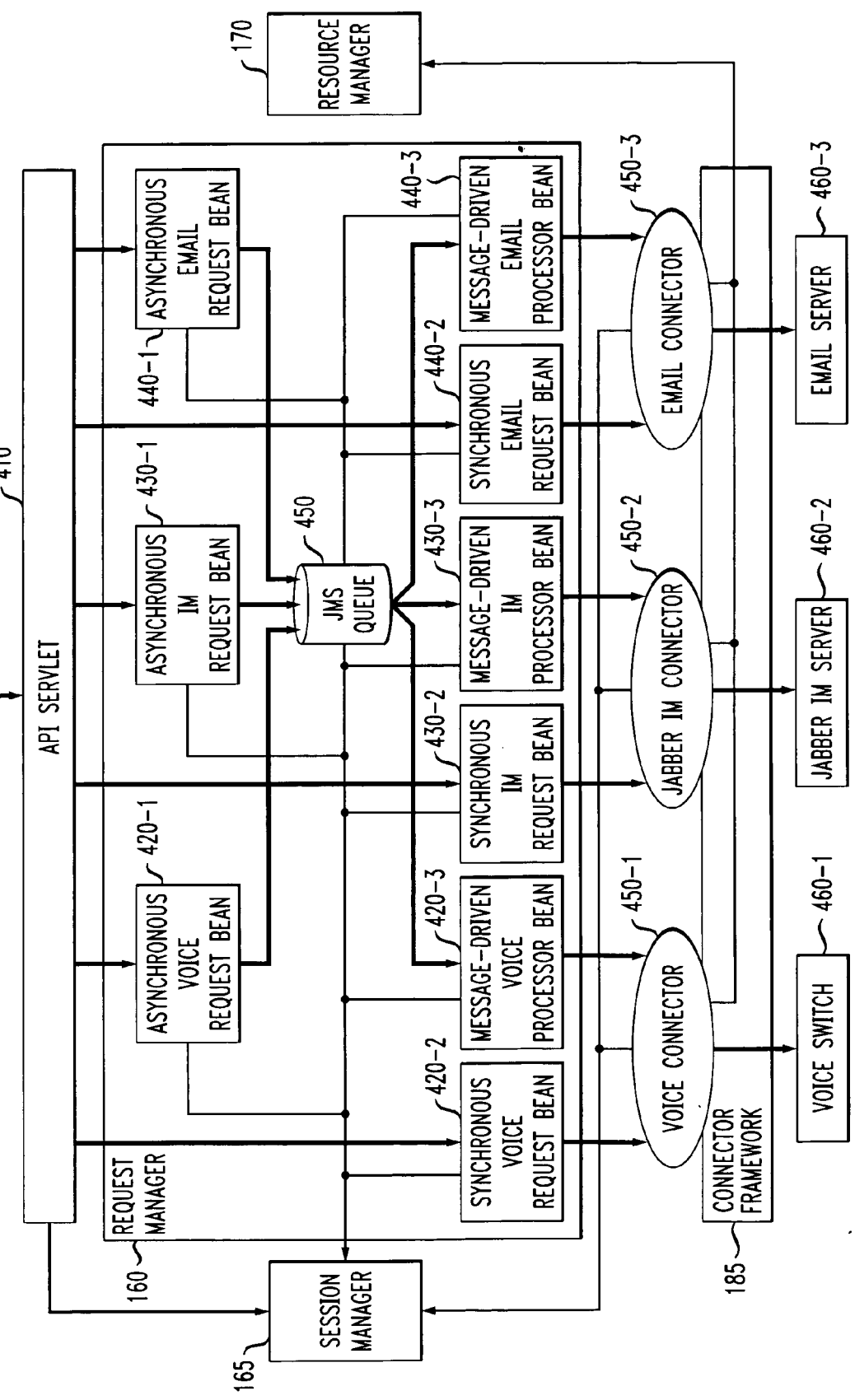
FIG. 4 is a schematic block diagram illustrating the interaction of the various components of the communication management layer of FIG. 1 in further detail.

FIG. 4 is a schematic block diagram illustrating the interaction of the various components of the communication management layer 150 of FIG. 1 in further detail. As shown in FIG. 4, the Communication Manager 150 offers an API 410 to the flow management layer 110 that can be implemented by a servlet. This API servlet 410 classifies the request either as a communication request or a request for entity relationship information and checks the request for syntactic and semantic validity. The servlet 410 hands over valid communication requests to the request manager 160 and all other valid requests to the entity relationship manager 165. For each valid request, the servlet 410 starts a J2EE UserTransaction that envelops all operations pertaining to this request. Eventually, the servlet 410 commits the UserTransaction or rolls it back in the case of an exception or a transaction timeout.

The illustrative communication application development and execution platform 100 thus delegates concurrency control to J2EE. Since J2EE currently does not permit the use of timers, the communication application development and execution platform 100 uses the UserTransaction and its timeout settings to also bound the time that a communication request spends waiting for fulfillment from the underlying communication infrastructure.

Request Manager

As shown in FIG. 4, the request manager 160 ties all other components in the communication manager 150 together. The request manager 160 contains three subcomponents voice requests 410, instant messaging requests 420, and email requests 430, respectively. The three subcomponents strongly resemble each other but accommodate different request parameters as required by the different media. Each subcomponent 410, 420, 430 has a synchronous, asynchronous and message-driven incarnation. All synchronous subcomponents perform the following operations:

acquisition of Enterprise Java Bean (EJB) resources (home and, in some cases, bean interfaces) used during communication operations;

creation of sessions for communication operations;

acquisition of the appropriate connectors for the communication operations. Connectors are part of the Connector Framework, as discussed below;

invocation of media-specific operations on connector objects. The connector objects reference media-specific resources offered by the resource manager 170 and perform the translation from abstract requests for communication operations into concrete operations on the underlying communication infrastructure; and logging of requests and results.

The asynchronous subcomponents extend this list with creating Java Messaging Services (JMS) messages that encapsulate requests and depositing such messages in a JMS queue 450; and retrieving requests from the JMS queue 450 and executing the requests, i.e., invoking media-specific operations on connector objects as in the synchronous case.

The retrieval of requests from JMS queues 450 is performed by message-driven beans 410-3, 420-3, 430-3. All other tasks on the list are implemented as stateless session beans. The strong commonalities among the subcomponents allowed a set of common abstract J2SE classes to be built that the subcomponents extend into the concrete bean classes of stateless session beans and message-driven beans. Notice that J2EE does not define the notion of bean inheritance and that therefore the employed inheritance hierarchy is on a per-class base, i.e., traditional J2SE inheritance.

Entity Relationship Manager

In the exemplary implementation of the communication application development and execution platform 100, a session is a single object. More specifically, it is an entity bean with container-managed persistence, so data persistence and distribution across servers in a clustered version of the communication application development and execution platform 100 is offloaded to J2EE. A session contains fields for the media type of the session (e.g., "voice conference"), the session name, a unique session ID, the session creation time as well as the session expiration time, and a hashtable that stores media-specific data such as the name of the VXML script to be rendered in the case of a first-party voice call or the conference name of an instant messaging conference. Users and their properties (phone numbers, instant messaging addresses, email addresses, etc.), endpoints (representing communication devices), activities, expertise, locations, projects are represented as entity beans with container-managed persistence as well. Sessions have relationships with users through endpoints because users are invited to sessions or currently participate in sessions and do so via a communication device. The relationship management is accomplished via the J2EE concept of container-managed relationships between the entities in the entity relationship model.

The API 410 that the communication management layer offers to the flow management layer contains complex queries on the relationship model. These queries are specified as part of the entity relationship manager but implemented by J2EE. Adding new queries thus is a very simple process, involving mostly configuration changes, that does not depend on the database used for storing the data that the entity relationship model holds.

As the connections between the entity relationship manager 165 and other components in the communication manager 150 in FIG. 4 indicates, the entity relationship manager 165 is a pivotal information repository. The session and relationship manager 165 receives data from the synchronous and asynchronous subcomponents of the request manager 160 that set up communication operations, disseminates data to the message-driven beans in the request manager 160 as well as the media-specific connectors in the connector framework, is queried by the API servlet 410, and stores many relevant events that the Event Manager collects from the underlying communication infrastructure (not shown in FIG. 4) and from external servers, services, devices, systems, and applications. Examples of such events are Jabber IM presence changes, conferees joining a voice conference or dropping off of a conference, and data gathered from users during interactive VXML script execution. The personal voice agents described below access entity relationship information directly without using the communication manager API 410.

Because J2EE does not allow the use of J2SE timers, a dedicated external J2SE program in the form of a J2EE application client performs periodic cleanup operations on the existing sessions and other entities. The cleanup is necessary in cases where participants of sessions leave sessions but software or hardware failures cause the relevant events to not get propagated to the entity relationship manager 165. For example, if the voice switch fails during an ongoing voice conference, the conferees will get disconnected but the entity relationship manager 165 will not get notified of the disconnect due to the switch failure.

Resource Manager

The resource manager 170 contains a set of components that are geared towards the specifics of the underlying communication infrastructure and that allow the communication application development and execution platform 100 to access the servers in that infrastructure. Access to the voice switch and the Jabber IM server may require components in the resource manager 170. Generally, the resource manager 170 has the following properties:

- For access to Internet Message Access Protocol (IMAPI) email servers, the communication application development and execution platform 100 can leverage the Java-Mail capabilities that are built into J2EE and therefore does not require any additional resource management.
- Wherever possible, the communication application development and execution platform 100 tracks resources in the underlying communication infrastructure such as voice switch ports by mapping these resources to entity beans. This allows the communication application development and execution platform 100 to persist the state of resource objects, to make them easily distributable across servers in a clustered version of the communication application development and execution platform 100, and allows complex queries on the set of available resources with little coding effort in the communication application development and execution platform 100.
- The communication application development and execution platform 100 acts as a Jabber IM client when accessing a Jabber IM server. An existing J2SE client-side Jabber IM library can be used to implement the protocol between the communication application development and execution platform 100 and a Jabber IM server. This library, however, is multi-threaded and thus cannot be absorbed into J2EE. When it is necessary to integrate with legacy code, a J2SE proxy server can accommodate the legacy code.

Media Enhancements and Event Manager

Generally, the media enhancements 175 and the event manager 180 are media-specific. It is noted, however, that the event manager 180 is comprised of a set of servlets that can be invoked by components in the underlying communication infrastructure. These servlets access certain beans in the communication manager 150, in particular, the beans of the entity relationship manager 165. The use of servlets is a natural fit for the event manager 180 because the current components in the underlying communication infrastructure that can report events to other systems have the ability to act as HTTP clients.

Connector Framework

To facilitate the addition of voice switches 460-1, instant messaging servers 460-2, and email servers 460-3 (collectively, communication servers 460) to the communication application development and execution platform 100, the connector framework 185 defines interfaces for J2SE classes 450-1 through 450-3 (connectors 450) that perform the translation from abstract service requests into concrete instructions for the communication servers. An example of an abstract service request for the voice connector is "place a call," with given parameters, whereas the sequence of concrete instructions in the voice connector implements the actual protocol to the voice switch that eventually places the call. Connectors can access additional resources in the resource manager 170. Such resource objects need to be tailored to the communication servers.

If the capabilities of a new communication server do not exceed those anticipated in the design of the request manager 160 or if new capabilities are present but need not be propagated to the flow management layer 110, adding the new communication server to the communication application development and execution platform 100 is a straightforward process. It consists of building the appropriate J2SE connector class according to the J2SE interface that the communication framework 185 contains, and additional resource classes if necessary. The communication framework 185 plus the resource manager 160 thus act as an abstraction layer that localizes communication server-specific code in the communication application development and execution platform 100.

Detailed Features

Media, Protocols, and Communications Operations

The exemplary implementation of the communication application development and execution platform 100 supports three communication media and protocols: voice using a proprietary protocol for a voice switch, instant messaging using Jabber IM, and email using IMAPI. The workflow programming interface offers the following communication operations:

- Voice: placing first-party calls to sets of phone numbers with rendition of specified and interactive VXML scripts; placing third-party calls; setting up voice conferences with designated voice greetings and personal voice agents for conferees;
- Instant messaging: sending instant messages to sets of recipients and setting up instant message conferences;
- Email: sending emails to sets of recipients with the option of including attachments.

The present invention defines a framework with Java interfaces that enables developers to add new communication servers implementing these three media with different protocols. To add a communication server with a different protocol, a specific Java interface must be implemented and the communication application development and execution platform 100 must be recompiled, reconfigured, and restarted. This framework is extensible so that developers can add communication servers implementing different communication media such as SIP, SMS, WAP or fax.

Abstraction, Integration and Convergence

The details of the protocols that are used to communicate with external servers 195, such as presence, availability and location servers, can be hidden from the applications. The level of programming abstraction can be elevated from dealing with, for example, ports on a voice switch or connection establishment with an instant messaging server to high-level tasks such as conference or IM message that developers connect with each other in flows. The flow programming interface incorporates all operations on the underlying media and on the components of the communication application development and execution platform 100 in one integrated environment.

Convergence of disparate media is accomplished through several features. For example, a user participating in a voice call can choose to have email and instant messages automatically rerouted to the call. When an email or instant message arrives for this user, he or she will be notified through a sound on the call and then the subject line of the message will be read to the user. Both the signal and the subject line rendition are audible only to the recipient. The communication application development and execution platform 100 introduces the notion of converged presence, which spans both instant messaging and voice calls. Thus, applications can query the presence status of a user and find out whether a given set of users is currently participating in an instant messaging or voice conference or in a voice call or have indicated that they are available to receive instant messages. Another example of convergence is the ability to access the entity relationship during an initiated voice conference, which allows a conferee to learn, for example, about the identities, and locations of other conferees, and the duration of the conference when the user joins.

Media Enhancements

The functionality of tasks is not necessarily backed by native capabilities of the underlying communication infrastructure. As a middleware platform, the communication application development and execution platform 100 can expand a task into an arbitrary set of operations on its own components and those of the underlying communication servers and thus offer more complex and more application-oriented media operations than what the underlying communication infrastructure implements. The convergence features described herein are examples of enhancements to the media functionality of the underlying communication infrastructure. Another example of media enhancements is the voice conferencing functionality that is not natively offered by the voice switch.

The personal voice agent is an example of media enhancements. It is a VXML program that can be injected into every call and voice conference established by the communication application development and execution platform 100. This VXML program can be configurable to incorporate application-specific and user-selected functionality. Generally, the personal voice agent speaks a configurable greeting to a conferee upon joining a conference. It stays silent on a call until one of two events occurs:

1. The user invokes the personal voice agent through pressing a key on a phone.
2. A message has been sent to the user as part of the execution of a flow by the communication application development and execution platform 100.

In the first case, the user is presented with a voice menu, only audible to this user, that gives access to the entity relationship model, in particular, to user data and allows retrieval of information about the other conferees or parties of a call such as the current number of conferees or parties, their identities, and their locations. Moreover, the personal voice agent allows the user to change settings that are in effect only for the duration of the call and that have relevance to the call. An example is the rerouting of text messages destined for the user to this call. The second case above refers to the ability of the communication application development and execution platform 100 to send an alert to a user on a call initiated by the communication application development and execution platform 100. The alert translates either into a signal tone that the user will hear or the voice rendition of the text of the alert, depending on the preferences of the sending flow and the recipient. In the former case, the recipient has the option of invoking the personal voice agent at any time and retrieving the alert text then.

Synchronous and Asynchronous Request Management

The communication application development and execution platform 100 processes requests for media operations, such as call setup requests, either in a synchronous or in an asynchronous fashion. The synchronous mode is appropriate when mostly requests with short-term interactions with the underlying media are expected. In the asynchronous mode, all requests are queued up before processing occurs. Requests are transacted in the communication application development and execution platform 100. Thus, each request, synchronous or asynchronous, will be processed to completion once and exactly once, even across restarts of the communication application development and execution platform 100. In other words, no request will get lost and requests do not get duplicated even in the event of a server outage. However, if, during partial processing of a request, communication with the outside world has taken place before a restart, this communication will be repeated after the restart.

A flow issuing either a synchronous or asynchronous request always receives a session handle from the communication application development and execution platform 100 in response to the request. The session handle identifies the request and allows the flow to track the status of the user interactions resulting from the request. For example, when a flow requests the establishment of an instant message conference, it can later check, for example, which user is currently participating in the conference, how long the conference has been in progress, and whether it has terminated.

The communication application development and execution platform 100 is extensible for cases where a flow application requires feedback after the completion of an asynchronous request. To this end, the communication application development and execution platform 100 offers a Java interface that can be implemented by an application designer. After completion of an asynchronous request, the communication application development and execution platform 100 calls a method in the implementation class and passes details about the request processing to this method.

Communication Resource Management

Certain media operations and, in particular, media enhancements 175 require management of certain media resources outside the underlying communication infrastructure. To enable conferencing, for example, the communication application development and execution platform 100 administers port and port assignment objects that reflect the supported and currently available ports, respectively, on the voice switch that it uses for placing conference call legs. The port assignment object for a given switch changes its state every time a call is placed and every time a conferee drops out of a conference call. Before setting up voice calls, the communication application development and execution platform 100 selects from the ports that are supported by the voice switch but are not part of the currently assigned ports. In the requests for call setup to the voice switch, the communication application development and execution platform 100 needs to include the addresses of the selected ports. Conference establishment works similar but, in a second step, the communication application development and execution platform 100 instructs the switch to connect to one another the ports that carry the voice legs of the conference.

The technology that enables on-call alerts and rerouting of text messages to phones as explained above is called shared voice channels. Shared voice channels allow voice calls to be shared between phones and flows that want to send alerts to users or render text messages over established calls. A shared voice channel is a resource administered by the communication application development and execution platform 100. Among the administrative duties are establishment of shared voice channels, request routing to the appropriate shared voice channels, multiplexing their use among requesters, and connecting them to the personal voice agents of users.

Another example of a communication resource managed by the communication application development and execution platform 100 is an instant messaging client. The communication application development and execution platform 100 connects to an instant messaging server as a programmatic client that establishes a link to a Jabber server. This client initiates all instant messaging operations, such as sending instant messages, instant messaging conference establishment, and requesting instant messaging presence information. This client contains an event listener that receives notifications from the Jabber server about presence status changes for instant messaging users.

Session and Relationship Management

When the flow engine 120 requests a high-level communication operation, the communication application development and execution platform 100 creates a session object that carries parameters for the operation to various components in the communication application development and execution platform 100. Some of the parameters eventually become part of the sequence of requests to the underlying communication infrastructure that ultimately implement the high-level communication operation. Examples of sessions are voice calls and instant message conferences. Examples of parameters for, say, a voice conference session are the ports on the voice switch that carry the conference calls, the configured voice greeting for conferees, the users invited to participate in this conference (invitees), the name of the conference and its setup time.

A session, however, not only stores static data pertinent to a communication operation but also dynamic data that flows may be interested in and can check for when querying the session object. Examples of such events are the current participants of a voice conference (active users). The set of active users is a subset of the set of invitees. Other examples are the termination time of a call or the feedback that a first-party call with an interactive VXML script gathered from a user. Thus, the communication application development and execution platform 100 not only initiates session objects with data but also collects dynamic data and propagates it to session objects.

The workflow programming interface contains predefined queries but for ad hoc queries flows can bypass the programming interface and execute the queries directly on the database representations of the entity relationship model. The entity relationship management directly supports complex reasoning about which user to communicate with, how, and when. An example of taking advantage of information presented by the entity relationship management is the determination that a specific user happens to be on a voice call initiated by the communication application development and execution platform 100 and the subsequent use of the shared voice channel feature to communicate with that user. An example of a more complex query supported by the entity relationship model would be "find all users who are currently not engaged in any activity and have expertise x and were part of the voice conference named y".

Currently, sessions are aligned with communication operations of potentially non-zero duration supported by the underlying communication infrastructure. However, flows could delineate sessions as well. This would enable flows to treat complex communications operations as objects of reasoning. An example of such a session would be sending out conference invitations to users via a variety of media, followed by the conference itself, followed by a post-conference email to all conference participants. This generalized notion of sessions would also allow navigable hierarchies of sessions.

Communication Tasks in Workflows

As previously indicated, an application developer employing the communication application design and execution platform 100 can automatically insert communication tasks into a workflow being developed. The communication application design and execution platform 100 automates the task of determining who, when and how to contact individuals. The application developer or an administrator can design a workflow that sequences the business and communication tasks. In one embodiment, the communication application design and execution platform 100 provides a graphical user interface that allows a developer to select an icon for various tasks, such as "contact a person" "establish a conference," and insert the icon into an appropriate portion of a workflow being developed. The details of how to contact the person, such as protocol and server connections, are addressed by the communication application design and execution platform 100.

Figure 5:
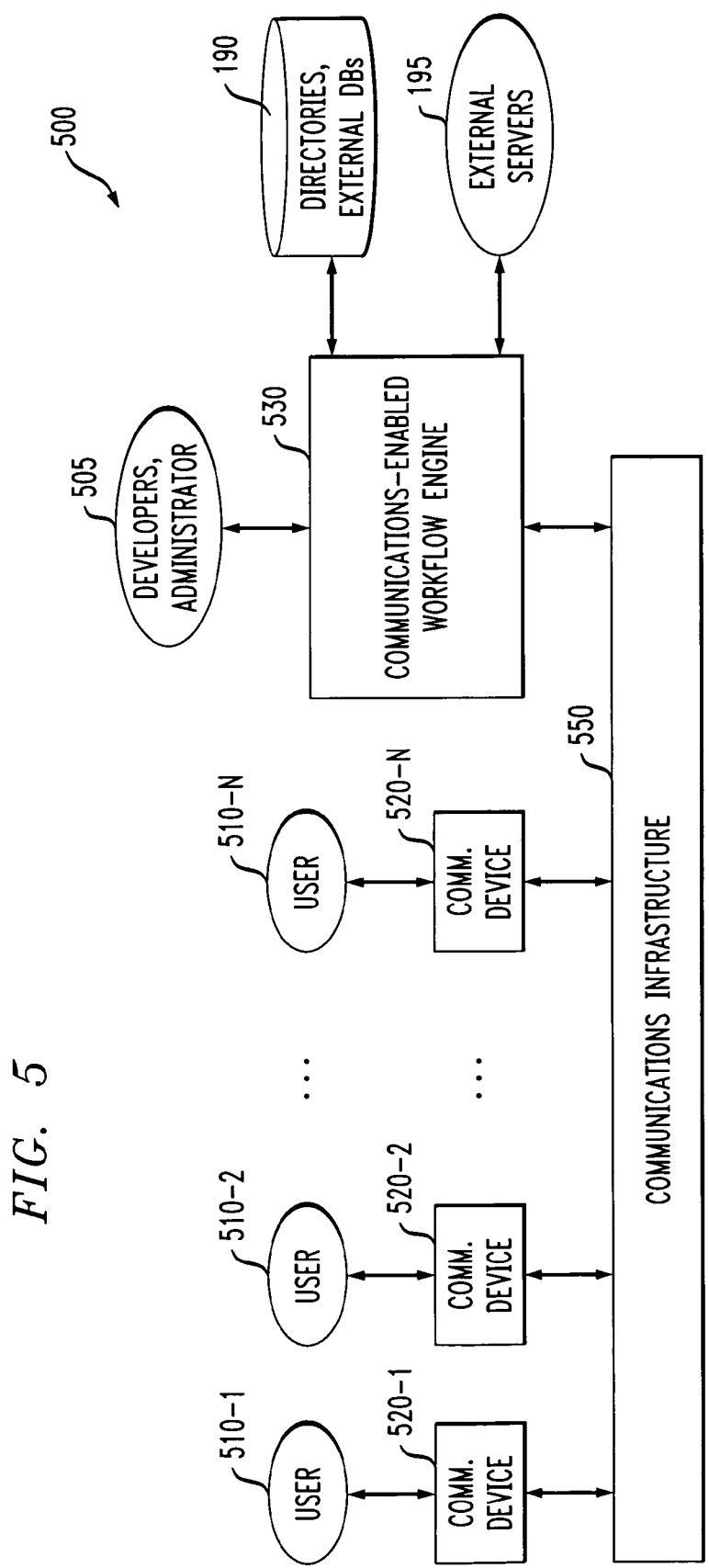
FIG. 5 illustrates a network environment in which the present invention can operate.

FIG. 5 illustrates a network environment 500 in which the present invention can operate. As shown in FIG. 5, a workflow engine 530 allows a developer or administrator 505 to generate or configure workflows that include one or more nodes that contact one or more users 510-1 through 510-N (collectively, users 510) that employ corresponding devices 520-1 through 520-N (collectively, devices 520). The devices 520 may be embodied, for example, as POTS or SIP telephones, a web browser, or an IM, email or SMS client. As previously indicated, the communication application design and execution platform 100 automatically configures the communication tasks so that details of the communications infrastructure 550 are addressed. The communications infrastructure 550 may include, for example, POTS, SIP, IM, email, WAP, SMS and Internet services and networks.

As discussed further below in conjunction with FIGS. 7 through 11, the workflow engine 530 provides a graphical user interface 700 that allows communication tasks to be inserted into a workflow being developed. The workflow itself may be embodied in XML code, such as the XML code 1200 discussed below in conjunction with FIG. 12.

Figure 6:
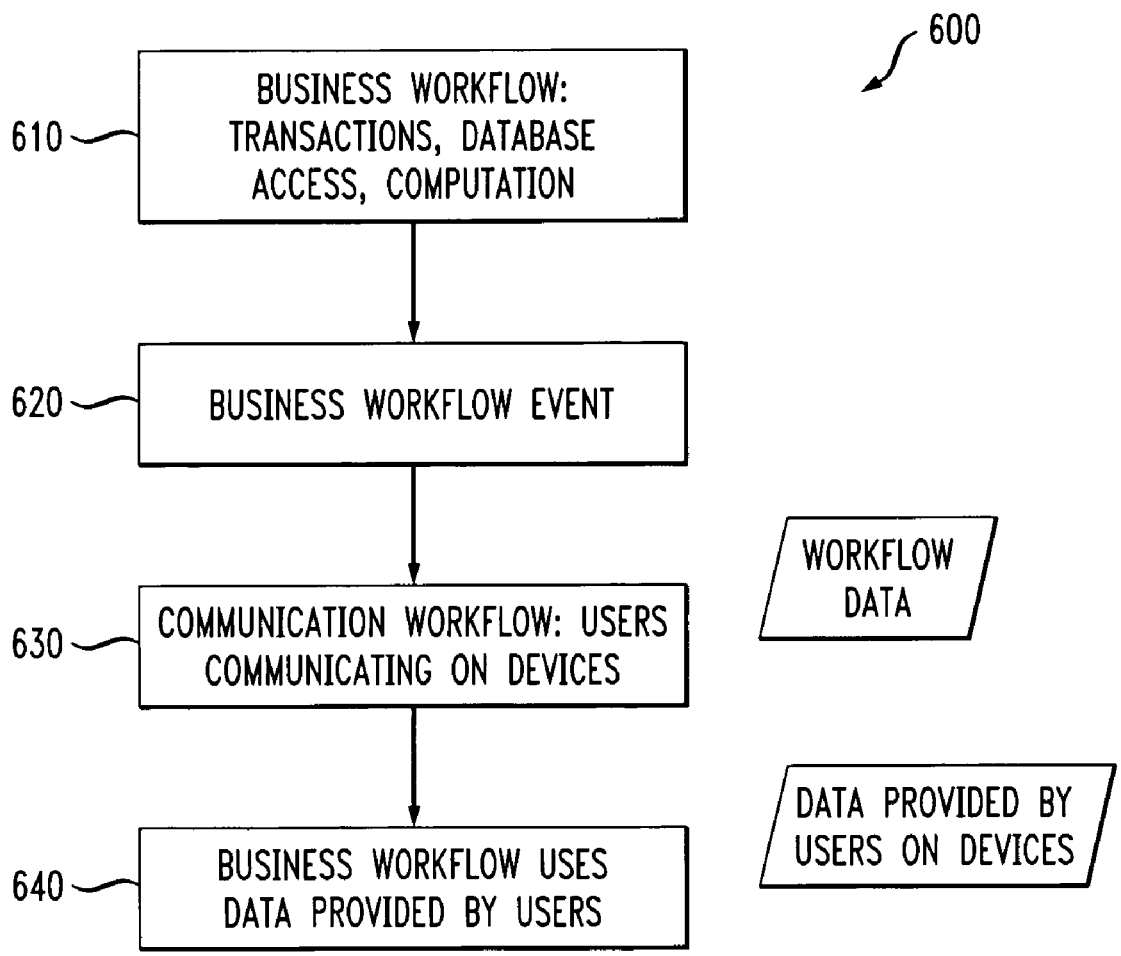
FIG. 6 is a flow chart describing an exemplary workflow incorporating features of the present invention.

FIG. 6 is a flow chart describing an exemplary workflow 600 incorporating features of the present invention. Generally, the workflow 600 illustrates the interaction between nodes associated with a business workflow and nodes associated with a communication workflow. As shown in FIG. 6, a workflow 600 in accordance with the present invention includes a business workflow 610 and a communications workflow 630. The business workflow 610 includes nodes to accomplish, for example, transactions, database accesses and computations, in a known manner. The business workflow 610 triggers one or more business workflow events 620. In accordance with the present invention, the communications workflow 630 includes nodes to contact users 510 communication on devices 520. The communications workflow 630 users data provided by users during step 640.

Figure 7:
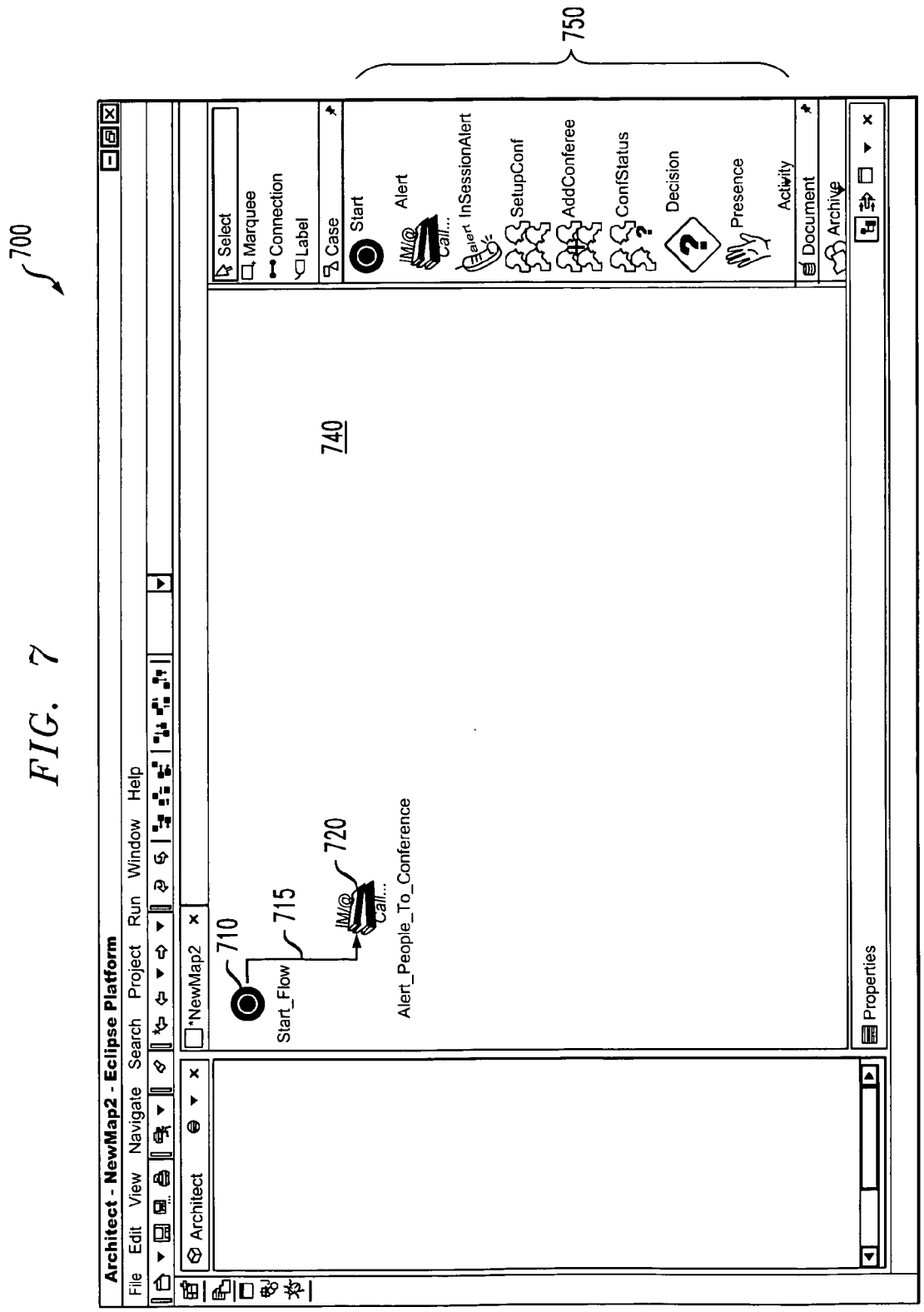
FIG. 7 illustrates an exemplary graphical user interface employed by the workflow engine of FIG. 5 to insert communication tasks into a workflow being developed.

FIG. 7 illustrates an exemplary graphical user interface 700 employed by the workflow engine 530 to insert communication tasks into a workflow being developed. As shown in FIG. 7, the graphical user interface 700 includes a palette 750 of icons that may be inserted into a workflow in a work space 740. Generally, the user (such as a developer or administrator) selects a desired icon from the palette 750 and inserts the icon in the appropriate position in the work space 740. In one exemplary implementation, the palette 750 includes icons for a start node, an alert node, an in Session alert node, a setup conference node, an add Conferee node, a conference status node, a decision node and a presence node.

In the exemplary workflow under development in FIG. 7, the user has selected and inserted a start node 710, connected by a connector 715 to an alert node 720. The exemplary XML code that will result from such a workflow is discussed below in conjunction with FIG. 12. The manner in which the alert node 720 is configured is discussed below in conjunction with FIG. 8.

FIG. 8 illustrates an exemplary properties dialog box 800 for configuring the alert node 720 of FIG. 7. As shown in FIG. 8, the properties dialog box 800 includes fields for specifying the connector type (i.e., media type, such as email, phone call or IM) 810, priority 820 (such as high, medium or low priority), alert message 830, response timeout 840 and whether presence information should be used 850. The alert message 830 generally specifies a template containing the content that should be delivered with the alert. Recipients can be added or deleted to the recipient list 890 by employing buttons 880, 885, respectively. The message originator is identified in field 895.

Figure 9:
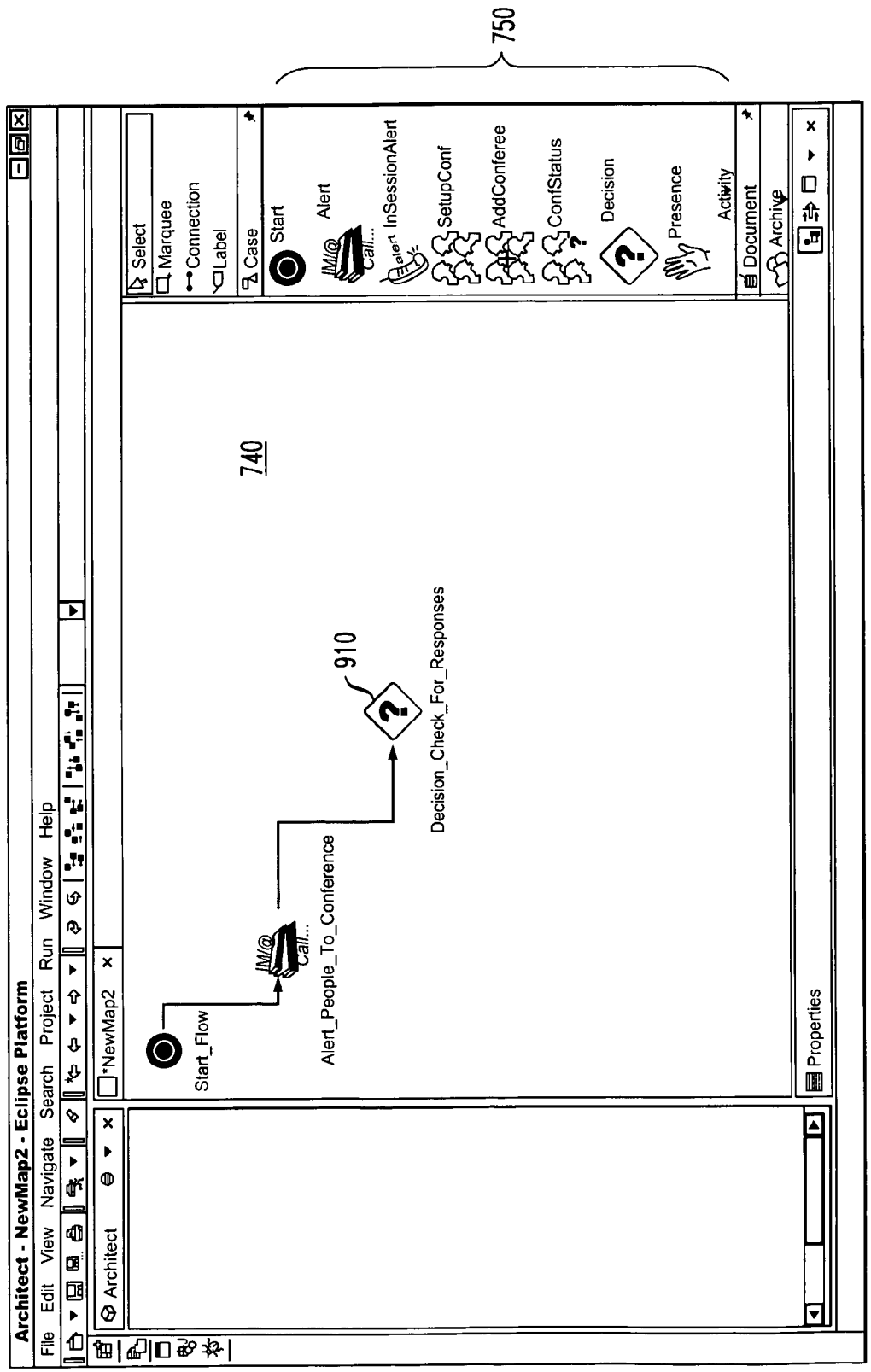
FIG. 9 illustrates the graphical user interface of FIG. 7 at a later stage of the creation of the workflow.

FIG. 9 illustrates the graphical user interface 700 of FIG. 7 at a later stage of the creation of the workflow. As shown in FIG. 9, the user has selected a decision node 910 from the palette 750 and inserted the decision node 910 into the workflow. A corresponding properties dialog box can be presented to the user to allow the user to specify the kind of decision being checked. For example, the decision node 910 of FIG. 9 determines whether all recipients of the alert have responded.

Figure 10:
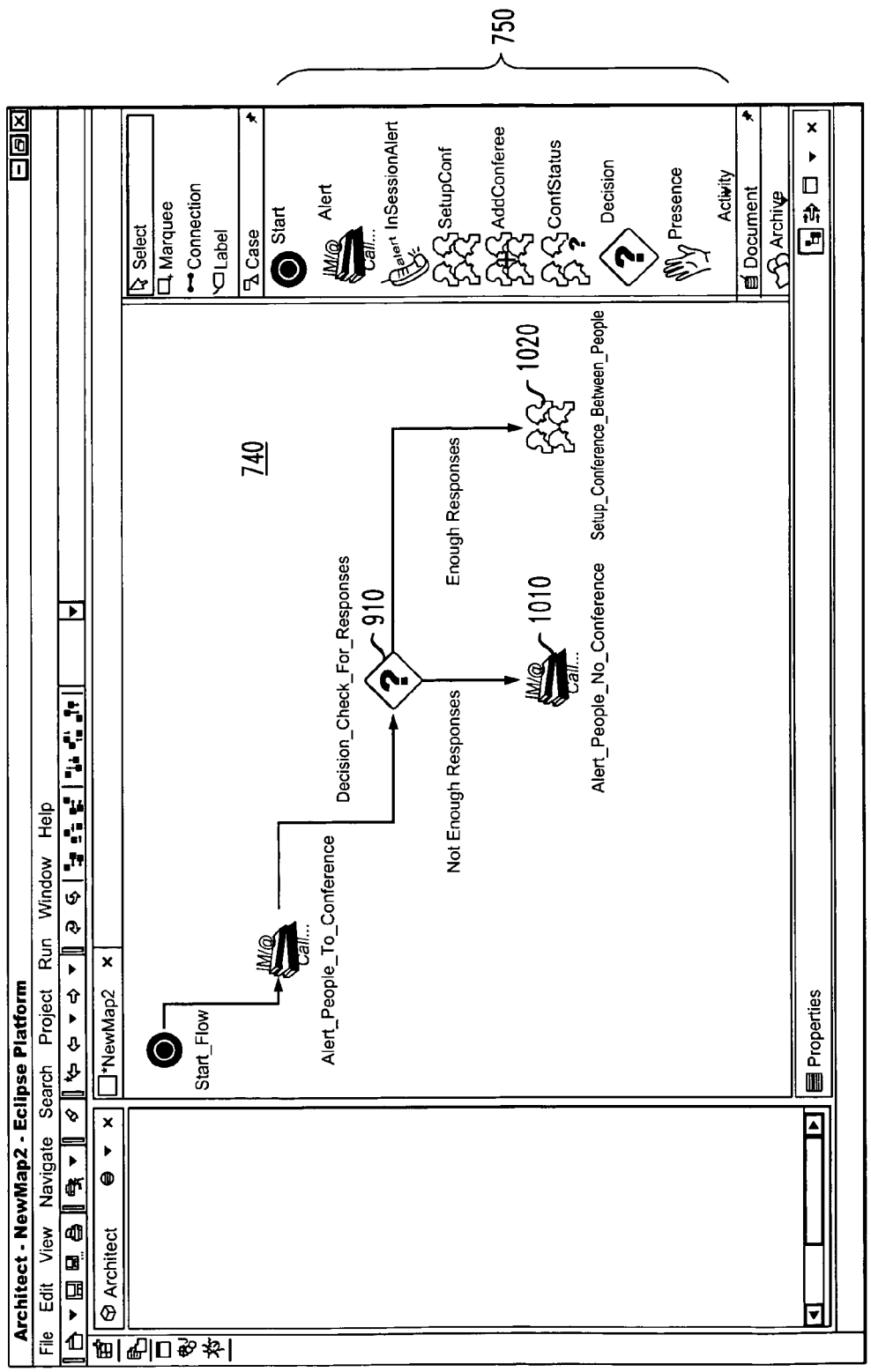
FIG. 10 illustrates the graphical user interface of FIG. 7 at yet another stage of the creation of the workflow.

FIG. 10 illustrates the graphical user interface 700 of FIG. 7 at yet another stage of the creation of the workflow. As shown in FIG. 10, the user has inserted nodes 1010, 1020 into the workflow following each branch of the decision node 910 of FIG. 9. If the decision node 910 determines that there are not enough responses to the request to set up a conference call (according to some threshold), then an alert message is sent according to node 1010 indicating that the conference has been cancelled. The properties dialog box to configure the node 1010 would be similar to the dialog box 800 of FIG. 8. If the decision node 910 determines that there are enough responses to the request to set up a conference call (according to some threshold), then the conference is established according to node 1020. The properties dialog box to configure the node 1020 is discussed below in conjunction with FIG. 11.

Figure 11:
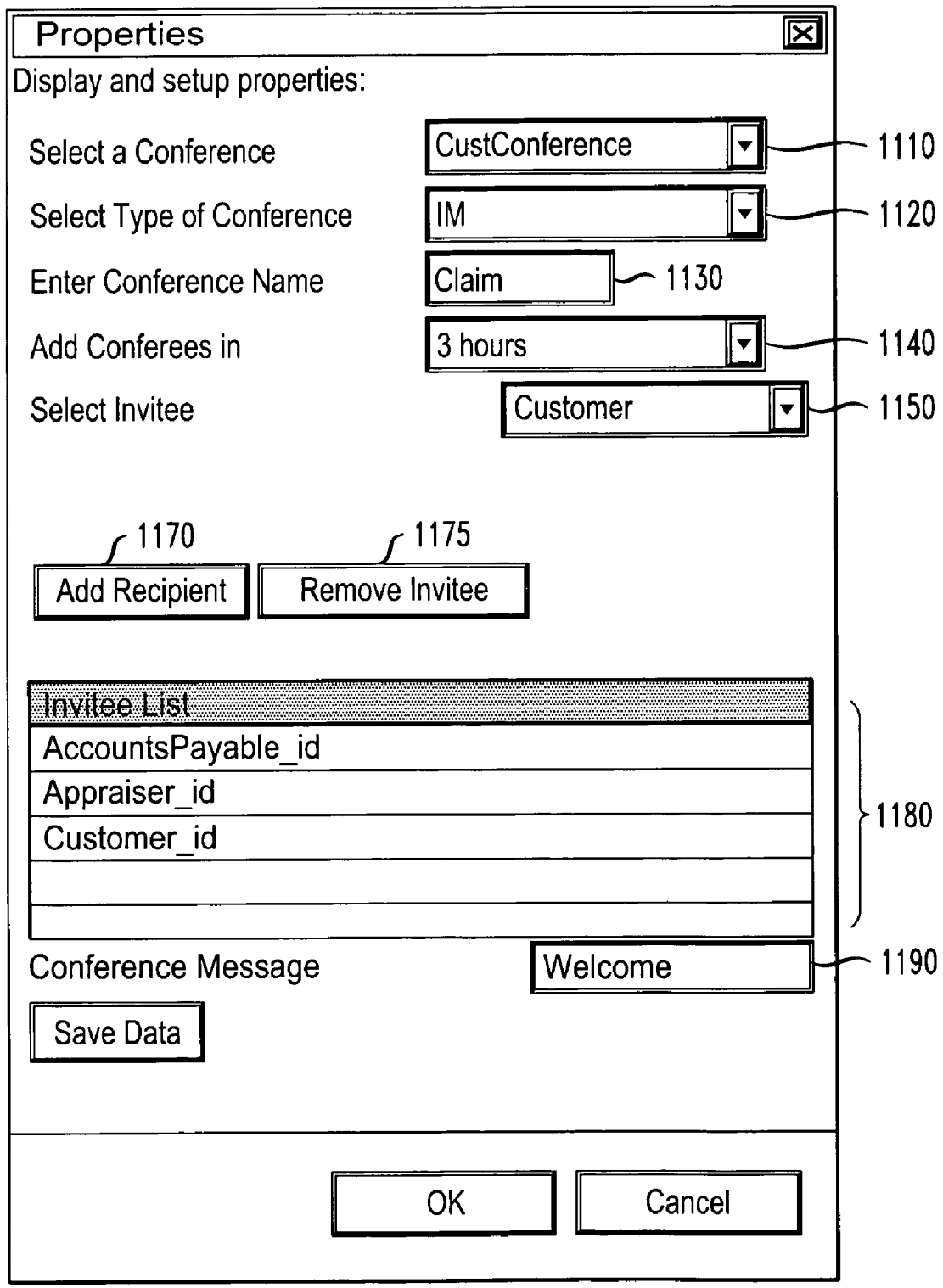
FIG. 11 illustrates an exemplary properties dialog box for configuring the setup conference node of FIG. 10.

FIG. 11 illustrates an exemplary properties dialog box 1100 for configuring the setup conference node 1020 of FIG. 10. As shown in FIG. 11, the properties dialog box 1100 includes fields for specifying a particular conference in field 1110, a conference type (i.e., media type) in field 1120, a conference name in field 1130, and the start time of the conference (relative to current time in exemplary embodiment) in field 1140. Invitees can be added or deleted to the invitee list 1180 by employing buttons 1170, 1175, respectively. The content to be presented at the initiation of the conference is illustrated in field 1190.

Figure 12:
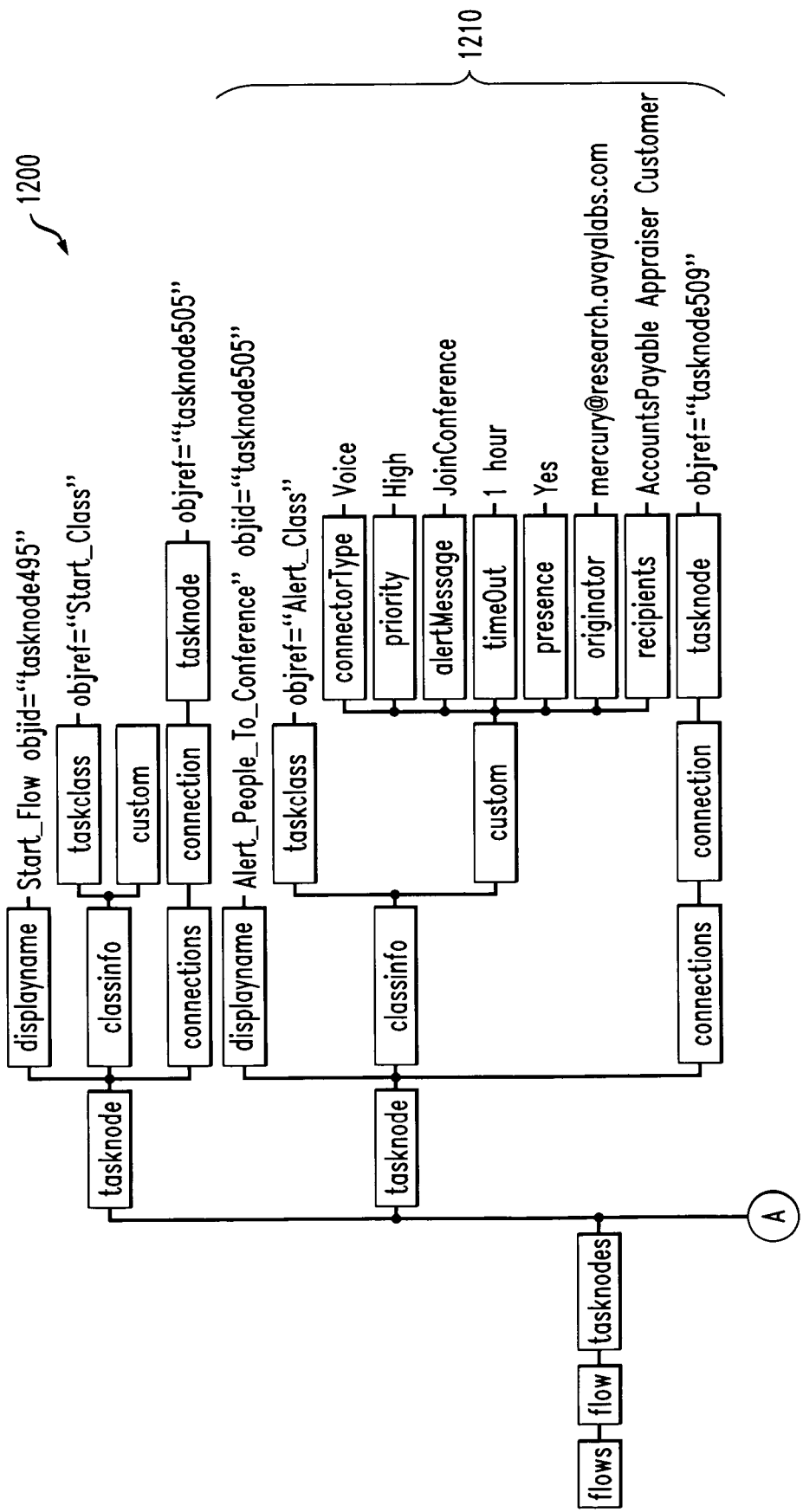
FIG. 12 illustrates exemplary XML code for the workflow created in conjunction with FIGS. 7 through 11.
Figure 12:
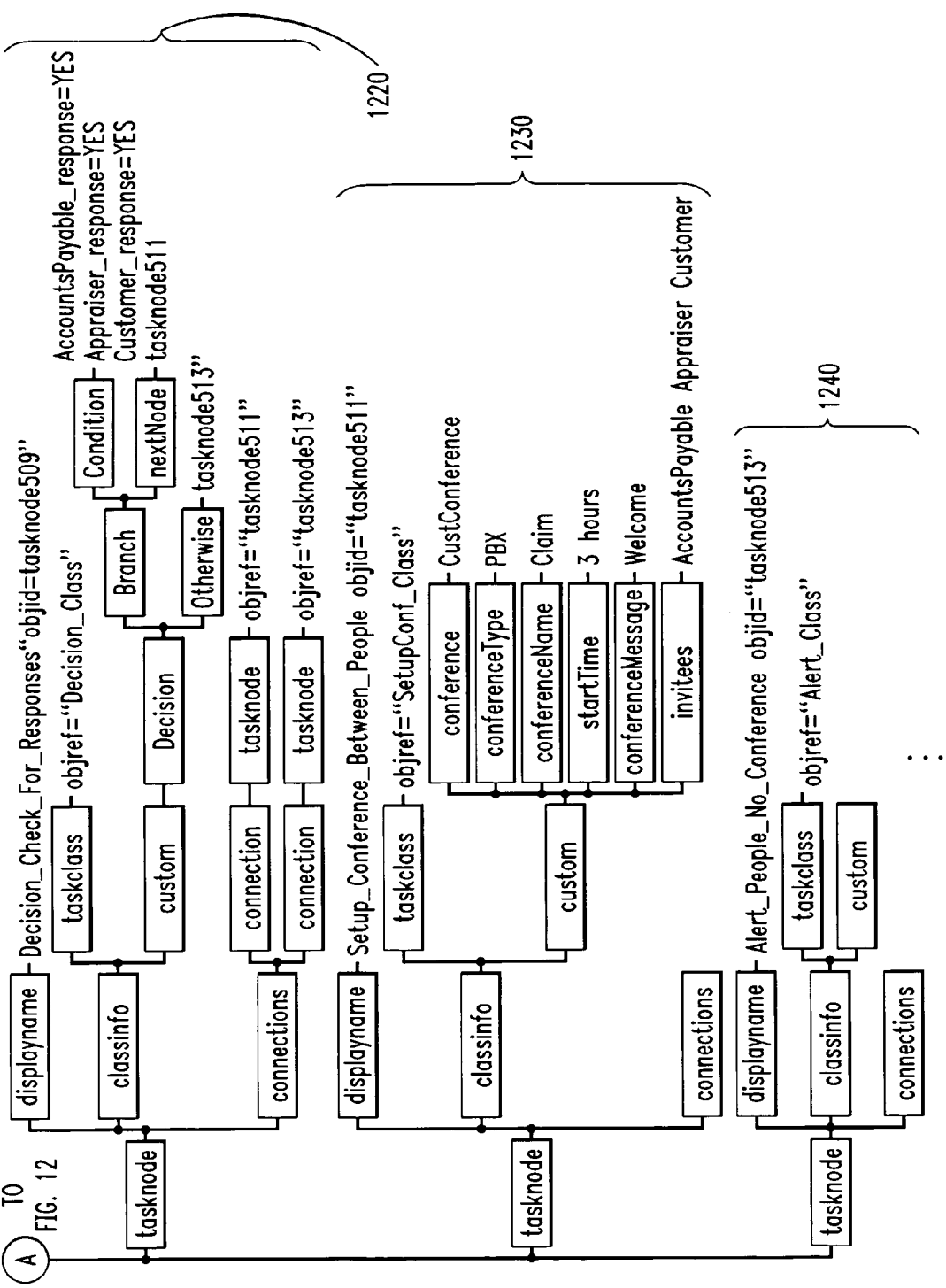

FIG. 12 illustrates an exemplary XML tree 1200 for storing the workflow shown in FIG. 10. As shown in FIG. 12, the XML tree 1200 includes a subtree 1210 corresponding to node 720 of the workflow; a subtree 1220 corresponding to node 910 of the workflow; a subtree 1230 corresponding to node 1020 of the workflow; and a subtree 1240 corresponding to node 1010 of the workflow. As shown in FIG. 12, the entire subtree under the "tasknode" under "connections—connection" is associated with the same node in the workflow. The "connections" for a node lists the connections (edges/lines) emanating out of the node. The number of connections for a node is usually one (exception is the Decision node where more than one connection can come out of the node). Thus, generally there is a straight link in the form "connections—connection". Under connection, the keyword tasknode lists the identifier of the node that is at the end of the connection (for the alert node, the next node is tasknode 509, which is the identifier of the Decision node).

Data Stored by Flow Layer 110

As previously indicated, the communication flow management layer 110 maintains an enterprise directory 190 containing a number of databases, such as user profiles roles, preferences and enterprise rules. In one exemplary implementation, the user profiles in the enterprise directory 190 contain the following records: user identifier:user name (first name, last name); location; address; contact addresses for variety of media (such as email, IM, workplace phone, home phone and cell phone) and preferred contact medium for different times of day (such as weekdays 8 am-5 pm: work phone, 5 pm-8 pm: cell phone, 8 pm-8 am: home phone; Weekends: cell phone).

In addition, user profiles are also maintained in the flow database to associate users with sessions. In one exemplary implementation, the user profiles in the flow database contain the following records: user identifier; user name; sessions in which user is a participant/invitee; and information relating to each session (such as responses; when the user joined and left the session; and level of control for the user, such as host or participant).

In addition, the flow database maintains session profiles to record information about each session. In one exemplary implementation, the session profiles in the flow database contain the following records: session identifier; name; type, such as conference or alert; SubType, such as IM, voice or email; invitees; participants (and optionally, whether they are active or inactive); start and end time; status (such as not yet started, alive, suspended or over); duration; session-related business workflow data; and subsession identifiers.

A set of communication flow profiles are also maintained to record flow information. In one exemplary implementation, the communication flow profiles contain the following records: flow identifier; status (such as executing or suspended); start node; current node; next node; communication users in a flow; communication sessions in a flow; and subflows.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   executing, by a device, a first node in a first workflow;
   transmitting, by the device, a first message to a first recipient in response to executing the first node in the first workflow;
   identifying, by the device, whether the first recipient satisfies a criterion of the first node;
   executing, by the device, a second node in the first workflow, wherein:
      i. the second node in the first workflow is executed when, and only when, the first recipient fails to satisfy the criterion of the first node, and
      ii. the second node in the first workflow includes a parameter that is resolved at run-time; transmitting, by the device, a second message to the first recipient and a second recipient in response to executing the second node in the first workflow; identifying, by the device, whether a minimum number of responses are received from the first recipient and the second recipient before establishing a communications session; and
   establishing, by the device, the communications session based at least in part on the parameter resolved at run-time, wherein the communications session is established between:
      i. the first recipient, and
      ii. the second recipient.

2. The method of claim 1, wherein the first recipient fails to satisfy the criterion of the first node when a response to the first message is not received by the device from the first recipient.

3. The method of claim 1, wherein the parameter resolved by the device at run-time identifies a temporal preference of the first recipient and the second recipient, and wherein the temporal preference specifies when to contact the first recipient and the second recipient on a given day.

4. The method of claim 1, wherein the parameter resolved by the device at run-time identifies a communications media preference of the first recipient and the second recipient for establishing the communications session.

5. The method of claim 1, wherein the parameter resolved by the device at run-time identifies whether the first recipient and the second recipient are present at:
   i. a first terminal of the first recipient, and
   ii. a second terminal of the second recipient.

6. The method of claim 1, wherein the parameter resolved by the device at run-time identifies the second recipient and a third recipient for establishing the communications session, and wherein:
   i. the first recipient,
   ii. the second recipient, and
   iii. the third recipient are different recipients.

7. The method of claim 1, wherein the communications session is established by the device when the minimum number of responses are received from the first recipient and the second recipient in response to the second message.

8. The method of claim 1 further comprising:
   executing, by the device, a node in a second workflow after establishing the communications session between the first recipient and the second recipient, wherein the node in the second workflow is executed based on a request received by the device from the second recipient.

9. The method of claim 8 further comprising:
   transmitting, by the device, a third message to a group of recipients in response to executing the node in the second workflow;
   receiving, by the device, a response from a third recipient in the group of recipients;
   identifying, by the device, whether the response from the third recipient is received within a time interval T; and
   automatically bridging, by the device, the third recipient into the communications session established between the first recipient and the second recipient when the device identifies that the response received from the third recipient is within the time interval T.

10. The method of claim 8 further comprising:
    transmitting, by the device, a third message to a group of recipients in response to executing the node in the second workflow;
    receiving, by the device, a response from a third recipient in the group of recipients;
    identifying, by the device, whether the response from the third recipient is received within a time interval T; and
    transmitting, by the device, a fourth message to the second recipient when the device identifies that the response received from the third recipient is not within the time interval T.

11. The method of claim 10, wherein:
    i. the fourth message is audio signals,
    ii. the fourth message is transmitted to the second recipient via an audio channel of the communications session, and
    ii. the fourth message is audible only to the second recipient.

12. The method of claim 1 further comprising:
    executing, by the device, a node in a second workflow after establishing the communications session between the first recipient and the second recipient, wherein the node in the second workflow is executed based in part on a request that is automatically transmitted from an application that monitors future tasks of the first recipient.

13. The method of claim 8 further comprising:
transmitting, by the device, a third message to the first recipient in response to executing the node in the second workflow, wherein:
  i. the third message is audio signals,
  ii. the third message is transmitted to the first recipient via an audio channel of the communications session, and
  iii. the third message is audible only to the first recipient.

14. A device comprising:
a memory; and
a processor, coupled to the memory, operative to:
execute a first node in a first workflow;
transmit a first message to a first recipient in response to executing the first node in the first workflow;
identify whether the first recipient satisfies a criterion of the first node;
execute a second node in the first workflow, wherein:
  i. the second node in the first workflow is executed when, and only when, the first recipient fails to satisfy the criterion of the first node, and
  ii. the second node in the first workflow includes a parameter that is resolved at run-time; transmit a second message to the first recipient and a second recipient in response to executing the second node in the first workflow; identify whether a minimum number of responses are received from the first recipient and the second recipient before establishing a communications session; and
establish the communications session based at least in part on the parameter resolved at run-time, wherein the communications session is established between:
  i. the first recipient, and
  ii. the second recipient.

15. The device of claim 14, wherein the processor is operative to:
establish the communications session when the minimum number of responses are received from the first recipient and the second recipient in response to the second message.

16. The device of claim 14, wherein the processor is further operative to:
execute a node in a second workflow after establishing the communications session between the first recipient and the second recipient, wherein the node in the second workflow is executed based on a request received by the device from the second recipient.

17. The device of claim 16, wherein the processor is further operative to:
transmit a third message to a group of recipients in response to executing the node in the second workflow;
receive a response from a third recipient in the group of recipients;
identify whether the response from the third recipient is received within a time interval T; and
automatically bridge the third recipient into the communications session established between the first recipient and the second recipient when the device identifies that the response received from the third recipient is within the time interval T.

18. The device of claim 16, wherein the processor is further operative to:
transmit a third message to a group of recipients in response to executing the node in the second workflow;
receive a response from a third recipient in the group of recipients;
identify whether the response from the third recipient is received within a time interval T; and
transmit a fourth message to the second recipient when the device identifies that the response received from the third recipient is not within the time interval T.

19. The device of claim 18, wherein:
  i. the fourth message is audio signals,
  ii. the fourth message is transmitted to the second recipient via an audio channel of the communications session, and
  iii. the fourth message is audible only to the second recipient.

20. The device of claim 14, wherein the processor is operative to:
execute a node in a second workflow after establishing the communications session between the first recipient and the second recipient, wherein the node in the second workflow is executed based in part on a request that is automatically transmitted from an application that monitors future tasks of the first recipient.

* * * * *